United States Patent
Sato

(10) Patent No.: US 7,409,411 B2
(45) Date of Patent: Aug. 5, 2008

(54) FILE MANAGEMENT PROGRAM, FILE MANAGEMENT METHOD, FILE MANAGEMENT APPARATUS, IMAGING DEVICE AND RECORDING MEDIUM

(75) Inventor: Tsuneo Sato, Asaka (JP)

(73) Assignee: Fujifilm Corporation, Tokyo (JP)

(*) Notice: Subject to any disclaimer, the term of this patent is extended or adjusted under 35 U.S.C. 154(b) by 479 days.

(21) Appl. No.: 10/878,267

(22) Filed: Jun. 29, 2004

(65) Prior Publication Data

US 2004/0267793 A1 Dec. 30, 2004

(30) Foreign Application Priority Data

Jun. 30, 2003 (JP) ............... 2003-187606
Jun. 21, 2004 (JP) ............... 2004-182766

(51) Int. Cl.
*G06F 17/00* (2006.01)

(52) U.S. Cl. .................. 707/104.1; 715/810

(58) Field of Classification Search .......... 707/104.1, 707/200, 205, 1, 100, 102, 3, 4; 715/810, 715/700, 713, 744, 762; 348/211.4; D16/200; 396/137

See application file for complete search history.

(56) References Cited

U.S. PATENT DOCUMENTS

| | | | | |
|---|---|---|---|---|
| 6,065,015 | A * | 5/2000 | Kazami | 707/104.1 |
| 6,643,641 | B1 * | 11/2003 | Snyder | 707/4 |
| 6,784,925 | B1 * | 8/2004 | Tomat et al. | 348/207.11 |
| 2001/0009456 | A1 | 7/2001 | Tanaka | |
| 2003/0088557 | A1 * | 5/2003 | Morino | 707/3 |
| 2003/0174217 | A1 * | 9/2003 | Kito et al. | 348/231.2 |
| 2005/0216435 | A1 * | 9/2005 | Lee | 707/1 |
| 2006/0026523 | A1 * | 2/2006 | Kitamaru et al. | 715/708 |

FOREIGN PATENT DOCUMENTS

| | | |
|---|---|---|
| EP | 0 727 906 A1 | 8/1996 |
| EP | 0 860 735 A2 | 8/1998 |
| JP | 11-262030 | 9/1999 |
| JP | 2001-169222 | 6/2001 |
| JP | 2003-037805 | 2/2003 |

OTHER PUBLICATIONS

David Campbell, "Extending the Windows Explorer with Name Space Extensions", Jul. 1996, Microsoft Systems Journal, Microsoft Co., Redmond, WA, US, pp. 89-96, XP000874429 ISSN: 0889-9932.
Uchibashi, S., et al., "Summarizing video using a shot importance measure and a frame-packing algorithm", Acoustics, Speech, and Signal Processing, 1999. Proceedings, 1999 IEEE International Conference on Phoenix, AZ, USA Mar. 15-19, 1999, Piscataway, NJ, USA, IEEE, US, vol. 6, Mar. 15, 1999, pp. 3041-3044, XP0010328149 ISBN: 0-7803-5041-3.

* cited by examiner

*Primary Examiner*—Greta L Robinson
(74) *Attorney, Agent, or Firm*—McGinn IP Law Group, PLLC

(57) ABSTRACT

When the mode of an electronic camera is set at folder creation mode and a release button is pressed, a new folder is created in a recording area of a recording medium and an icon image of the newly created folder is created. The icon image is created based on image data photographed in response to the press of the release button. A list of folders created in the recording medium is displayed with folder icons on an image display device and an icon image is displayed on each folder icon. From the displayed list of folders, the user selects a folder for recording the image data.

18 Claims, 16 Drawing Sheets

| 3/4 OR LARGER IN TOTAL NUMBER OF RECORDED IMAGE FILES | L=15mm |
| --- | --- |
| 2/4 TO 3/4 IN TOTAL NUMBER OF RECORDED IMAGE FILES | L=10mm |
| 1/4 TO 2/4 IN TOTAL NUMBER OF RECORDED IMAGE FILES | L=7mm |
| LESS THAN 1/4 IN TOTAL NUMBER OF RECORDED IMAGE FILES | L=5mm |

SIZE SWITCHING TABLE

FILE MANAGEMENT PROGRAM, FILE MANAGEMENT METHOD, FILE MANAGEMENT APPARATUS, IMAGING DEVICE AND RECORDING MEDIUM

BACKGROUND OF THE INVENTION

1. Field of the Invention

The present invention relates to a file management program, a file management method, a file management apparatus, an imaging device, and a recording medium and particularly relates to a file management program, a file management method, a file management apparatus, an imaging device, and a recording medium whereby files can be sorted and organized.

2. Description of the Related Art

In the case of a digital still camera, when a subject is photographed, image data indicating a subject image is recorded on a recording medium such as a memory card.

In conventional digital still cameras, when such image data is recorded on a recording medium, one folder is formed in the recording medium and the image data is sequentially stored in the folder.

However, in such a system of recording image data in a single folder, it is difficult to sort and organize image data at some future date.

Japanese Patent Application Publication No. 11-262030 suggests that a photographing reference board having a keyword is photographed with a subject by a digital camera and photographed images are sorted by keyword.

Japanese Patent Application Publication No. 2001-169222 suggests that a plurality of folders are prepared beforehand to allow the user to arbitrarily select a folder to record an image.

Japanese Patent Application Publication No. 2003-37805 suggests that a folder is prepared for each picture taking mode and recording folders are automatically sorted according to picture taking modes before recording.

SUMMARY OF THE INVENTION

However, the method of Japanese Patent Application Publication No. 11-262030 requires the photographing reference board having a keyword, resulting in troublesome management.

Further, in the method of Japanese Patent Application Publication No. 2001-169222, folders are managed only by numbers. Thus, the contents of the folders cannot be recognized at first glance, resulting in inconvenience when the number of folders increases.

Moreover, the method of Japanese Patent Application Publication No. 2003-37805 automatically determines a recording folder according to a picture taking mode, so that recording may not be performed with a sort intended by a photographer.

The present invention is devised in view of such circumstances and has as its object the provision of a file management program, a file management method, a file management apparatus, an imaging device, and a recording medium whereby files can be managed with ease.

In order to attain the above object, a first aspect of the present invention provides a file management program for creating a folder in a recording area of a recording medium, storing a file in the folder, and managing the file, the program causing a computer to function as: a device for providing an instruction to create a folder in the recording area of the recording medium, a device for creating a folder in the recording area of the recording medium in response to the instruction to create the folder, a device for inputting image data to be used as an icon image of the created folder, a device for creating an icon image of the folder based on the inputted image data, a device for storing, in a storage device, information about the folder created in the recording area of the recording medium and the icon image of the folder, a device for providing an instruction to display a list of folders created in the recording area of the recording medium, and a device for displaying, on a display device, a list of folders created in the recording area of the recording medium based on the information stored in the storage device in response to the instruction to display a list of folders, the list being displayed with folder icons having the icon images.

According to the invention of the first aspect, when an instruction to create a folder is provided and image data is inputted, the folder is newly created in the recording area of the recording medium and an icon image of the folder is created based on the inputted image data. Then, the storage device stores information about the folder created and the icon image of the folder. Further, when an instruction to display a list of folders is provided, the display device displays a list of folders created in the recording area of the recording medium based on the information stored in the storage device, the list being displayed with folder icons having the icon images. Thus, folders can be clearly discriminated from one another and can be managed with ease.

In order to attain the above object, a second aspect of the present invention provides the file management program according to the first aspect, wherein the computer is caused to function as a device for selecting a folder for storing a file, from a list of folders displayed with folder icons on the display device.

According to the invention of the second aspect, a folder for storing a file can be selected from a list of folders displayed with folder icons on the display device and thus a folder for storing a file can be selected with ease.

In order to attain the above object, a third aspect of the present invention provides the file management program according to the first or second aspect, wherein the computer is caused to function as: a device for providing an instruction to successively create folders, and a device for creating a folder under the previously created folder in response to the instruction to successively create folders.

According to the invention of the third aspect, when an instruction to successively create folders is provided, a folder is created under the previously created folder. Thus, folders can be organized in a hierarchical manner and the folders can be resorted according to applications. As a result, the contents of the folders can be readily recognized.

In order to attain the above object, a fourth aspect of the present invention provides the file management program according to the first, second, or third aspect, wherein the computer is caused to function as: a device for selecting a folder having an icon image to be changed, from a list of folders displayed with folder icons on the display device, a device for inputting image data to be used as a new icon image of the selected folder, a device for creating a new icon image of the folder based on the inputted image data, and a device for rewriting the information stored in the storage device.

According to the invention of the fourth aspect, it is possible to change an icon image displayed on a folder icon. That is, when a folder having an icon image to be changed is selected from a list of folders displayed with folder icons on the display device and image data is inputted, an icon image is newly created based on the inputted image data. Then, the newly created icon image is written over in the storage device as a new icon image of the selected folder. Hence, only the icon image displayed on the folder icon can be changed while files stored in the folder remain the same.

In order to attain the above object, a fifth aspect of the present invention provides a file management method for creating a folder in a recording area of a recording medium, storing a file in the folder, and managing the file, the method comprising the steps of: creating a folder in the recording area of the recording medium in response to an instruction to create the folder, inputting image data to be used as an icon image of the created folder, creating an icon image of the folder based on the inputted image data, storing, in a storage device, information about the folder created in the recording area of the recording medium and the icon image of the folder, and displaying, on a display device, a list of folders created in the recording area of the recording medium based on the information stored in the storage device in response to an instruction to display a list of folders, the list being displayed with folder icons having the icon images.

According to the invention of the fifth aspect, when an instruction to create a folder is provided and image data is inputted, a folder is newly created in the recording area of the recording medium and an icon image of the folder is created based on the inputted image data. Then, information about the created folder and the icon image of the folder is stored in the storage device. Further, when an instruction to display a list of folders is provided, the display device displays a list of folders created in the recording area of the recording medium based on the information stored in the storage medium, the list being displayed with folder icons having the icon images. Thus, folders can be clearly discriminated from one another and can be managed with ease.

In order to attain the above object, a sixth aspect of the present invention provides the file management method according to the fifth aspect, further comprising the step of selecting a folder for storing a file, from a list of folders displayed with the folder icons on the display device.

According to the invention of the sixth aspect, a folder for storing a file can be selected from a list of folders displayed with folder icons on the display device and thus a folder for storing a file can be selected with ease.

In order to attain the above object, a seventh aspect of the present invention provides the file management method according to the fifth or sixth aspect, further comprising the step of creating a folder under the previously created folder in response to an instruction to successively create folders.

According to the invention of the seventh aspect, when an instruction to successively create folders is provided, a folder is created under the previously created folder. Thus, folders can be organized in a hierarchical manner and the folders can be resorted according to applications. As a result, the contents of the folders can be readily recognized.

In order to attain the above object, an eighth aspect of the present invention provides the file management method according to the fifth, sixth, or seventh aspect, further comprising the steps of: selecting a folder having an icon image to be changed, from a list of folders displayed with the folder icons on the display device, inputting image data to be used as a new icon image of the selected folder, creating a new icon image of the folder based on the inputted image data, and rewriting the information stored in the storage device.

According to the invention of the eighth aspect, it is possible to change an icon image displayed on a folder icon. That is, when a folder having an icon image to be changed is selected from a list of folders displayed with folder icons on the display device and image data is inputted, an icon image is newly created based on the inputted image data. Then, the newly created icon image is written over in the storage device as a new icon image of the selected folder. Hence, only the icon image displayed on the folder icon can be changed while files stored in the folder remain the same.

In order to attain the above object, a ninth aspect of the present invention provides a file management apparatus for creating a folder in a recording area of a recording medium, storing a file in the folder, and managing the file, the apparatus, comprising: a folder creation instructing device for providing an instruction to create a folder in the recording area of the recording medium, a folder creating device for creating a folder in the recording area of the recording medium in response to the instruction of the folder creation instructing device to create the folder, an image input device for inputting image data to be used as an icon image of the folder created by the folder creating device, an icon image creating device for creating an icon image of the folder based on the image data inputted from the image input device, a folder information storage device for storing information about the folder created in the recording area of the recording medium and the icon image of the folder, a folder display instructing device for providing an instruction to display a list of folders created in the recording area of the recording medium, and a display control device for displaying, on a display device, a list of folders created in the recording area of the recording medium based on the information stored in the folder information storage device in response to the instruction to display the list of folders from the folder display instructing device, the list being displayed with folder icons having the icon images.

According to the invention of the ninth aspect, when an instruction to create a folder is provided by the folder creation instructing device and image data is inputted from the image input device, a folder is newly created in the recording area of the recording medium by the folder creating device and an icon image of the folder is created by the icon image creating device based on the inputted image data. Then, information about the created folder and the icon image of the folder is stored in the folder information storage device. Further, when an instruction to display a list of folders is provided by the folder display instructing device, the display device displays a list of folders created in the recording area of the recording medium based on the information stored in the folder information storage device, the list being displayed with folder icons having the icon images. Thus, folders can be clearly discriminated from one another and can be managed with ease.

In order to attain the above object, a tenth aspect of the present invention provides the file management apparatus according to the ninth aspect, further comprising a recording folder selecting device for selecting a folder for storing a file, from a list of folders displayed with the folder icons on the display device.

According to the invention of the tenth aspect, a folder for storing a file can be selected by the recording folder selecting device from a list of folders displayed with folder icons on the display device and thus a folder for storing a file can be selected with ease.

In order to attain the above object, an eleventh aspect of the present invention provides the file management apparatus according to the ninth or tenth aspect, further comprising a folder successive creation instructing device for providing an instruction to successively create folders, wherein the folder creating device creates a folder under the previously created folder in response to an instruction of the folder successive creation instructing device to successively create folders.

According to the invention of the eleventh aspect, when an instruction to successively create folders is provided by the folder successive creation instructing device, a folder is created under the previously created folder. Thus, folders can be organized in a hierarchical manner and the folders can be resorted according to applications. As a result, the contents of the folders can be readily recognized.

In order to attain the above object, a twelfth aspect of the present invention provides the file management apparatus according to the ninth, tenth, or eleventh aspect, further comprising: a folder selecting device for selecting a folder having an icon image to be changed, from a list of folders displayed with folder icons on the display device, a new icon image creating device for creating a new icon image of the folder, which has been selected by the folder selecting device, based on the image data inputted from the image input device, and a folder information updating device for replacing information about the icon image of the folder selected by the folder selecting device with information about the new icon image created by the new icon image creating device.

According to the invention of the twelfth aspect, it is possible to change an icon image displayed on a folder icon. That is, when a folder having an icon image to be changed is selected by the folder selecting device from a list of folders displayed with folder icons on the display device and image data is inputted from the image input device, an icon image is newly created by the new icon image creating device based on the inputted image data. Then, the newly created icon image is written over in the folder information storage device as a new icon image of the selected folder. Hence, only the icon image displayed on the folder icon can be changed while files stored in the folder remain the same.

In order to attain the above object, a thirteenth aspect of the present invention provides an imaging device, in which image data can be recorded as an image file of a predetermined format in a recording medium, the image data having been acquired from an imaging device in response to an instruction to photograph, and the image file recorded in the recording medium can be reproduced and displayed on a display device, comprising: a folder creation mode setting device for setting a mode of the imaging device at folder creation mode, a folder creating device for creating a new folder in a recording area of the recording medium in response to the instruction to photograph in the folder creation mode, an icon image creating device for creating an icon image of the newly created folder in the folder creation mode, the icon image creating device acquiring the image data from the imaging device in response to the instruction to photograph and creating the icon image based on the image data, a folder information storage device for storing information about the folder created in the recording area of the recording medium and the icon image of the folder, a display control device for displaying, on the display device, a list of folders created in the recording area of the recording medium based on the information stored in the folder information storage device, the list being displayed with folder icons having the icon images, a recording folder selecting device for selecting a desired folder icon from the folder icons displayed on the display device to select a folder for recording the image data having been acquired from the imaging device, and a recording control device for recording the image data, which has been acquired from the imaging device, in the folder selected by the recording folder selecting device.

According to the invention of the thirteenth aspect, an image (icon image) can be displayed on a folder icon and an image photographed by the user can be used as the image displayed on the folder icon. That is, when the mode of the imaging device is set at the folder creation mode and an instruction to photograph is provided, the folder creating device creates a new folder in the recording area of the record-ing medium and the icon image creating device creates the icon image of the newly created folder. The icon image creating device acquires image data from the imaging device in response to the instruction to photograph and creates an icon image based on the image data. Then, the folder information storage device stores information about the newly created folder and the icon image. The display control device displays, on the display device, a list of folders created in the recording area of the recording medium based on the information stored in the folder information storage device, the list being displayed with folder icons having the icon images. Then, when the recording folder selecting device selects a desired folder icon from the folder icons displayed on the display device, the photographed image data is recorded in the folder having the selected folder icon. In this way, a list of folders is displayed on the display device with folder icons having icon images and a recording folder is selected from the folder icons, so that a recording folder can be selected with ease and image data can be readily managed after photographing.

In order to attain the above object, a fourteenth aspect of the present invention provides the imaging device according to the thirteenth aspect, wherein after the folder creating device creates a new folder in the recording area of the recording medium under the folder creation mode in response to an instruction to photograph, when another instruction to photograph is provided, the folder creating device creates a new folder under the newly created folder.

According to the invention of the fourteenth aspect, folders can be organized in a hierarchical manner. That is, in the folder creation mode, when the instruction to photograph is provided to create a folder in the recording area of the recording medium and then the instruction to photograph is provided again, another new folder is created under the created folder. Hence, it is possible to finely sort folders according to applications and readily recognize the contents.

In order to attain the above object, a fifteenth aspect of the present invention provides the imaging device according to the thirteenth or fourteenth aspect, further comprising: an icon image change mode setting device for setting the mode of the imaging device at icon image change mode, a folder selecting device for selecting a folder having an icon image to be changed, by selecting a desired folder icon from a list of folders displayed with the folder icons on the display device by the display control device in the icon image change mode, a new icon image creating device for creating a new icon image of the folder selected by the folder selecting device, the new icon image creating device acquiring image data from the imaging device in response to the instruction to photograph and creating the new icon image based on the image data in the icon image change mode, and a folder information updating device for replacing information about the icon image of the folder selected by the folder selecting device with information about the new icon image and causing the folder information storage device to store the information.

According to the invention of the fifteenth aspect, it is possible to change an icon image displayed on a folder icon. That is, when the mode of the imaging device is set at the icon image change mode, a folder having a folder icon to be changed is selected from a list of folders displayed with folder icons on the display device, and the instruction to photograph is provided, the new icon image creating device acquires image data from the imaging device and creates a new icon image based on the image data. Then, as a new icon image of the folder selected by the folder selecting device, the new icon image created by the new icon image creating device is written over in the folder information storage device. Hence, only the icon image of the folder icon can be changed while image files stored in the folder remain the same.

In order to attain the above object, a sixteenth aspect of the present invention provides an imaging device, in which image data can be recorded as an image file of a predetermined format in a recording medium, the image data having been acquired from an imaging device in response to the instruction to photograph, and the image file recorded in the recording medium can be reproduced and displayed on a display device, comprising: a folder creation mode setting device for setting a mode of the imaging device at folder creation mode, an image selecting device for selecting an image to be used as an icon image from images reproduced and displayed on the display device in the folder creation mode, a folder creating device for creating a new folder in a recording area of the recording medium in response to image selection of the image selecting device in the folder creation mode, an icon image creating device for creating an icon image of the newly created folder in response to the image selection of the image selecting device in the folder creation mode, the icon image creating device creating the icon image based on the image data of the image selected by the image selecting device, a folder information storage device for storing information about the folder created in the recording area of the recording medium and the icon image of the folder, a display control device for displaying, on the display device, a list of folders created in the recording area of the recording medium based on the information stored in the folder information storage device, the list being displayed with folder icons having the icon images, a recording folder selecting device for selecting a desired folder icon from the folder icons displayed on the display device to select a folder for recording the image data having been acquired from the imaging device, and a recording control device for recording the image data, which has been acquired from the imaging device, in the folder selected by the recording folder selecting device.

According to the invention of the sixteenth aspect, an image (icon image) can be displayed on a folder icon, and an image selected at random by the user from photographed images can be used as the icon image. That is, when the mode of the imaging device is set at the folder creation mode and the image selecting device selects an image to be used as an icon image from images reproduced and displayed on the display device, the folder creating device creates a new folder in the recording area of the recording medium and the icon image creating device creates an icon image of the newly created folder. The icon image creating device creates an icon image based on the image data of the image selected by the image selecting device. Then, the folder information storage device stores information about the newly created folder and the icon image. The display control device displays, on the display device, a list of folders created in the recording area of the recording medium based on the information stored in the folder information storage device, the list being displayed with folder icons having the icon images. Then, when a desired folder icon is selected from the folder icons displayed on the display device, the photographed image data is recorded in the folder having the selected folder icon. In this way, a list of folders is displayed on the display device with folder icons having icon images and a recording folder is selected from the folder icons, so that a recording folder can be selected with ease and image data can be readily managed after photographing.

In order to attain the above object, a seventeenth aspect of the present invention provides the imaging device according to the sixteenth aspect, wherein when the folder creating device creates a new folder in the recording area of the recording medium in response to the image selection of the image selecting device and then another image is selected by the image selecting device, the folder creating device creates another new folder under the newly created folder.

According to the invention of the seventeenth aspect, folders can be organized in a hierarchical manner. That is, in the folder creation mode, when an image is selected by the image selecting device to create a folder in the recording area of the recording medium and then another image is selected by the image selecting device, another new folder is created under the created folder. Hence, it is possible to finely sort folders according to applications and readily recognize the contents.

In order to attain the above object, an eighteenth aspect of the present invention provides the imaging device according to the sixteenth or seventeenth aspect, further comprising: an icon image change mode setting device for setting the mode of the imaging device at icon image change mode, a folder selecting device for selecting a folder having an icon image to be changed, by selecting a desired folder icon from a list of folder icons displayed on the display device by the display control device in the icon image change mode, a new icon image creating device for creating a new icon image of the folder selected by the folder selecting device, the new icon image creating device creating the new icon image based on the image selected by the image selecting device from the images reproduced and displayed on the display device in the icon image change mode, and a folder information updating device for replacing information about the icon image of the folder selected by the folder selecting device with information about the new icon image and causing the folder information storage device to store the information.

According to the invention of the eighteenth aspect, it is possible to change an icon image displayed on a folder icon. That is, when the mode of the imaging device is set at the icon image change mode, a folder having a folder icon to be changed is selected from a list of folders displayed with folder icons on the display device, and the an image is selected by the image selecting device, the new icon image creating device creates a new icon image based on the image data of the image selected by the image selecting device. Then, as a new icon image of the folder selected by the folder selecting device, the new icon image created by the new icon image creating device is written over the information of the folder information storage device. Hence, only the icon image of the folder icon can be changed while image files stored in the folder remain the same.

In order to attain the above object, a nineteenth aspect of the present invention provides a file management program for displaying a list of folders, which have been created in a recording area of a recording medium, with folder icons on a display device in response to an instruction to display the list of folders, the program causing a computer to function as a device for displaying, on the display device, the folder icon varied in size on each folder according to a capacity or the number of files stored in each folder.

According to the invention of the nineteenth aspect, the folder icon indicating the folder is varied in size according to the capacity or the number of image files recorded in the folder. Hence, an amount of the contents of each folder can be recognized at a glance only by looking at the folder icon, thereby facilitating management of folders.

In order to attain the above object, a twentieth aspect of the present invention provides the file management program according to the nineteenth aspect, wherein the computer is caused to function as a device for displaying, near the folder icon of each folder, a capacity or the number of files recorded in each folder, and displaying a total capacity or a total number of files recorded in the recording medium on the display device.

According to the invention of the twentieth aspect, the capacity or the number of image files actually recorded in each folder is displayed near the folder icon of each folder. Thus, it is possible to further facilitate management of folders.

In order to attain the above object, a twenty-first aspect of the present invention provides a file management method for displaying a list of folders, which have been created in a recording area of a recording medium, with folder icons on a display device in response to an instruction to display the list of folders, wherein the display device is caused to display the folder icon varied in size on each folder according to a capacity or the number of files stored in each folder.

According to the invention of the twenty-first aspect, the folder icon indicating the folder is varied in size according to the capacity or the number of image files recorded in the folder. Hence, an amount of the contents of each folder can be recognized at a glance only by looking at the folder icon, thereby facilitating management of folders.

In order to attain the above object, a twenty-second aspect of the present invention provides the file management method according to the twenty-first aspect, wherein a capacity or the number of image files recorded in each folder is displayed near the folder icon of each folder and a total capacity or a total number of files recorded in the recording medium is displayed on the display device.

According to the invention of the twenty-second aspect, the capacity or the number of image files actually recorded in each folder is displayed near the folder icon of each folder. Thus, it is possible to further facilitate management of folders.

In order to attain the above object, a twenty-third aspect of the present invention provides a file management apparatus for displaying a list of folders, which have been created in a recording area of a recording medium, with folder icons on a display device in response to an instruction to display the list of folders, the apparatus further comprising: a detecting device for detecting a capacity or the number of files stored in each folder, and a display control device for displaying the folder icon varied in size on each folder according to a capacity or the number of files detected by the detecting device on the display device.

According to the invention of the twenty-third aspect, the folder icon indicating the folder is varied in size according to the capacity or the number of image files recorded in the folder. Hence, an amount of the contents of each folder can be recognized at a glance only by looking at the folder icon, thereby facilitating management of folders.

In order to attain the above object, a twenty-fourth aspect of the present invention provides the file management apparatus according to the twenty-third aspect, wherein the display control device displays, near the folder icon of each folder, a capacity or the number of files recorded in each folder, and displays a total capacity or a total number of files recorded in the recording medium on the display device.

According to the invention of the twenty-fourth aspect, the capacity or the number of image files actually recorded in each folder is displayed near the folder icon of each folder. Thus, it is possible to further facilitate management of folders.

In order to attain the above object, a twenty-fifth aspect of the present invention provides an imaging device, in which a folder is created in a recording area of a recording medium and image data acquired via an imaging device is recorded as an image file of a predetermined format in the folder, comprising: a display device, and a display control device for displaying, with folder icons on the display device, a list of folders created in the recording area of the recording medium, the display control device displaying the folder icon varied in size according to a capacity or the number of image files recorded in each folder.

According to the invention of the twenty-fifth aspect, the folder icon indicating the folder is varied in size according to the capacity or the number of image files (the number of images) recorded in the folder. Hence, an amount of the contents of each folder can be recognized at a glance only by looking at the folder icon, thereby facilitating management of folders.

In order to attain the above object, a twenty-sixth aspect of the present invention provides the imaging device according to the twenty-fifth aspect, wherein the display control device displays, near the folder icon of each folder, the capacity or the number of image files recorded in each folder, and displays a total capacity or a total number of image files recorded in the recording medium.

According to the invention of the twenty-sixth aspect, the capacity or the number of image files (the number of images) actually recorded in each folder is displayed near the folder icon of each folder. Thus, it is possible to further facilitate management of folders.

In order to attain the above object, a twenty-seventh aspect of the present invention provides a file management program for creating a plurality of folders in a recording area of a recording medium and recording a file in a folder designated from the plurality of folders, the program causing the computer to function as a device for providing files stored in the designated file with names not overlapping in one recording medium.

According to the invention of the twenty-seventh aspect, when image files are recorded in a folder created in the recording medium, file names are provided so as not to overlap in one recording medium. Hence, for example, when files in the recording medium are captured into another device, it is possible to prevent a previously captured image file from being overwritten and deleted.

In order to attain the above object, a twenty-eighth aspect of the present invention provides the file management program according to the twenty-seventh aspect, wherein the folder created in the recording area of the recording medium is provided with a folder name for identifying the folder, and the file is provided with a file name which is a combination of a folder name of a recording folder and a file number for identifying each file in the recording folder.

According to the invention of the twenty-eighth aspect, a different file name is provided for each folder. Thus, even when files are captured into another device, the files can be sorted by file name, thereby facilitating management of files.

In order to attain the above object, a twenty-ninth aspect of the present invention provides a file management method for creating a plurality of folders in a recording area of a recording medium and recording a file in a folder designated from the plurality of folders, the method comprising the step of providing files stored in the designated folder with names not overlapping in one recording medium.

According to the invention of the twenty-ninth aspect, when files are recorded in a folder created in the recording medium, file names are provided so as not to overlap in one recording medium. Hence, for example, when files in the recording medium are captured into another device, it is possible to effectively prevent a previously captured file from being overwritten and deleted.

In order to attain the above object, a thirtieth aspect of the present invention provides the file management method according to the twenty-ninth aspect, wherein the folder created in the recording area of the recording medium is provided with a folder name for identifying the folder, and the file is provided with a file name which is a combination of a folder name of a recording folder and a file number for identifying each file in the recording folder.

According to the invention of the thirtieth aspect, a different file name is provided for each folder. Thus, even when files are captured into another device, the files can be sorted by file name, thereby facilitating management of files.

In order to attain the above object, a thirty-first aspect of the present invention provides a file management apparatus for creating a plurality of folders in a recording area of a recording medium and recording a file in a folder designated from the plurality of folders, the apparatus comprising a recording control device which provides an image file recorded in the folder with a file name and records the file, wherein the recording control device provides files stored in the designated folder with names not overlapping in one recording medium.

According to the invention of the thirty-first aspect, when files are recorded in a folder created in the recording medium, file names are provided so as not to overlap in one recording medium. Hence, for example, when files in the recording medium are captured into another device, it is possible to effectively prevent a previously captured file from being overwritten and deleted.

In order to attain the above object, a thirty-second aspect of the present invention provides the file management apparatus according to the thirty-first aspect, wherein the folder created in the recording area of the recording medium is provided with a folder name for identifying the folder, and the recording control device provides the file with a file name which is a combination of a folder name of a recording folder and a file number for identifying each file in the recording folder.

According to the invention of the thirty-second aspect, a different file name is provided for each folder. Thus, even when files are captured into another device, the files can be sorted by file name, thereby facilitating management of files.

In order to attain the above object, a thirty-third aspect of the present invention provides an imaging device, in which a plurality of folders are created in a recording area of a recording medium and image data acquired via an imaging device is recorded as an image file of a predetermined format in a folder designated from the plurality of folders, comprising: a recording control device for naming the image file to be recorded in the folder and recording the image file, wherein the recording control device provides names not overlapping in one recording medium and records the image file.

According to the invention of the thirty-third aspect, when image files are recorded in a folder created in the recording medium, file names are provided so as not to overlap in one recording medium. Hence, for example, when image files in the recording medium are captured into a personal computer and so on, it is possible to effectively prevent a previously captured image file from being overwritten and deleted.

In order to attain the above object, a thirty-fourth aspect of the present invention provides the imaging device according to the thirty-fifth aspect, wherein the folder created in the recording area of the recording medium has a folder name for identifying each folder, and the recording control device provides the image file with a file name and records the image file, the file name being created by combining the folder name of a recording folder with a file number for identifying each image file in the recording folder.

According to the invention of the thirty-fourth aspect, a different file name is provided for each folder. Thus, even when image files are captured into a personal computer and so on, the image files can be sorted by file name, thereby facilitating management of image files.

In order to attain the above object, a thirty-fifth aspect of the present invention provides An imaging device, in which a folder is created in a recording area of a recording medium and image data acquired via an imaging device is recorded as an image file of a predetermined format in the folder, comprising: a display device, and a display control device for displaying, with folder icons on the display device, a list of folders created in the recording area of the recording medium, the display control device displaying folder icons of lower folders in a horizontal direction with respect to folder icons of upper folders and displaying folder icons on the same level in parallel in a vertical direction.

According to the invention of the thirty-fifth aspect, the icons of folders on the same level are displayed in parallel in a vertical direction and the icons of folders on different levels are displayed in parallel in a horizontal direction. Hence, it is possible to recognize the hierarchical structure of folders in a limited display space at a glance, thereby facilitating management of folders.

In order to attain the above object, a thirty-sixth aspect of the present invention provides a recording medium for creating a folder in a recording area and storing a file in the folder, wherein information about the folder created in the recording area and an icon image of the folder is recorded in a predetermined recording area.

According to the invention of the thirty-sixth aspect, information about a folder created in the recording area of the recording medium and the icon image of the folder is recorded in a predetermined recording area of the recording medium. As a result, a list of folders created in the recording area of the recording medium can be displayed on a display based on the information recorded in the predetermined recording area of the recording medium, the list being displayed with folder icons having icon images.

As described above, according to the present invention, an image can be displayed on a folder icon displayed on the display device. An image inputted or photographed by the user or an image selected from photographed images can be used as the image on the folder icon. Thus, the contents of each folder can be recognized at a glance by looking at folder icons and thus files can be sorted and organized with ease. Since an image displayed on the folder icon can be changed, files can be more readily sorted and organized. Further, folders can be hierarchically organized and thus the folders can be finely sorted according to applications. Moreover, even when the recording medium is replaced with another, the setting before replacement can be taken over to another recording medium after replacement. Thus, even when the recording medium is replaced with another, another setting is not necessary for the recording medium after replacement, thereby improving operability.

Moreover, according to the present invention, the size of a folder icon indicating a folder is varied in size according to the capacity or the number of files recorded in a folder. Thus, the capacity of each folder can be recognized at a glance only by looking at the folder icon, thereby facilitating management. At this point, the capacity or the number of files actually recorded in each folder is displayed near the folder icon, thereby further facilitating management of folders.

Furthermore, according to the present invention, when files are recorded in a folder created in the recording medium, file names are provided so as not to overlap in one recording medium. Hence, for example, when files in the recording medium are captured into a personal computer and so on, it is possible to effectively prevent a previously captured file from being overwritten and deleted. At this point, a different file name is provided for each folder and thus the image files can be sorted by file name, thereby facilitating management of files.

Additionally, according to the present invention, the icons of folders on the same level are displayed in parallel in a vertical direction and the icons of folders on different levels are displayed in parallel in a horizontal direction. Hence, it is possible to recognize the hierarchical structure of folders in a limited display space at a glance, thereby facilitating management of folders.

DETAILED DESCRIPTION OF THE PREFERRED EMBODIMENTS

The following will specifically describe preferred embodiments of a file management program, a file management method, a file management apparatus, an imaging device, and a recording medium of the present invention in accordance with the accompanying drawings.

Figure 1:
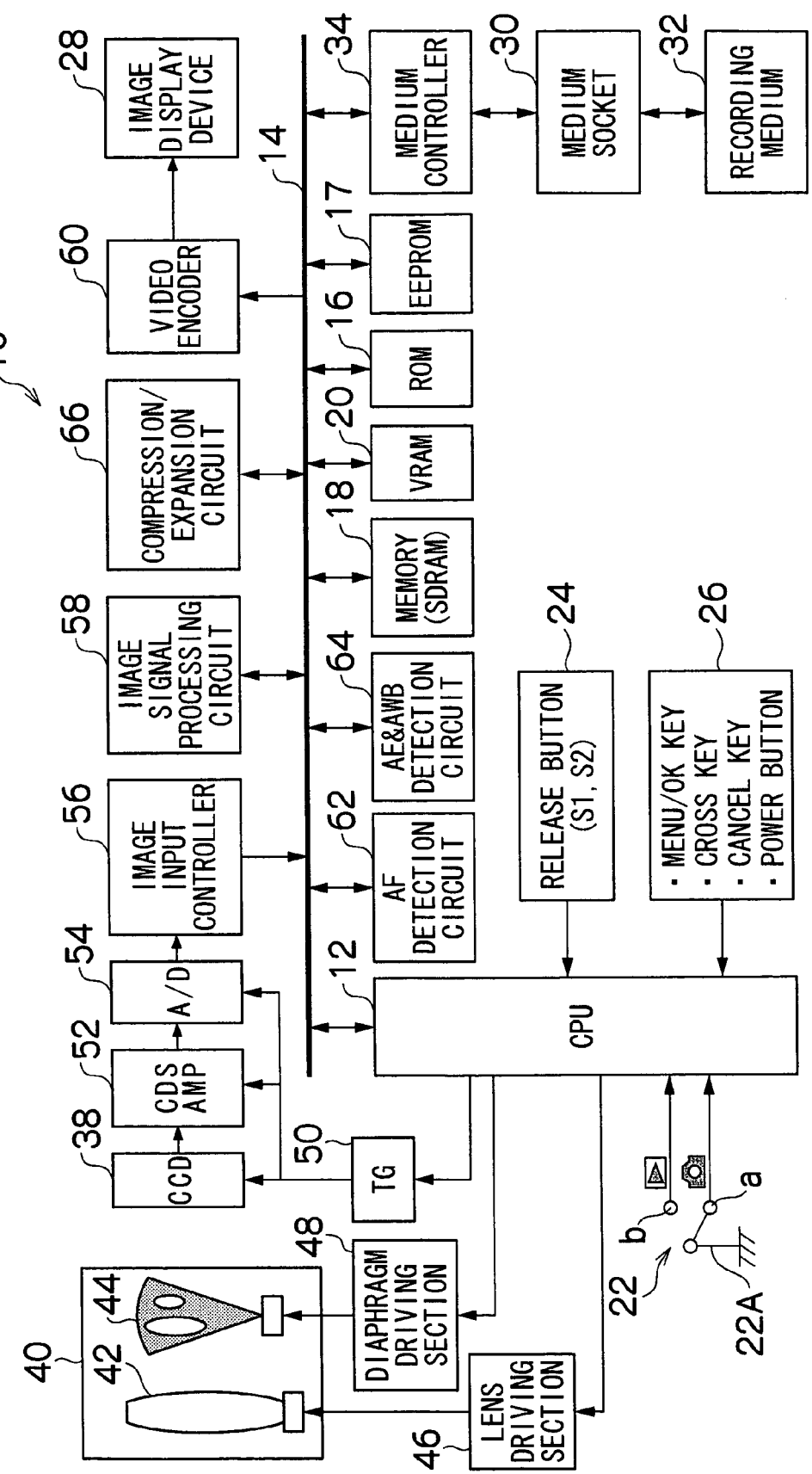
FIG. 1 is a block diagram showing an embodiment of a digital still camera according to the present invention.

FIG. 1 is a block diagram showing an embodiment of a digital still camera according to the present invention. A digital still camera 10 comprises the function of recording/reproducing a static image and the function of editing a recorded image file. The overall operation is controlled by a central processing unit (CPU) 12.

The CPU 12 acts as a control device for controlling a camera system according to a predetermined program and acts as an arithmetic device for performing operations such as autoexposure (AE), autofocus (AF), and white balance (WB) adjusting operations.

A ROM 16 connected to the CPU 12 via a bus 14 stores programs performed by the CPU 12 and various kinds of data for control, and an EEPROM 17 stores various kinds of setting information including folder management information on the operations of the digital still camera 10.

A memory (SDRAM) 18 is used as an arithmetic area of the CPU 12 and is used as a temporary storage area of image data and sound data. VRAM 20 is used as a temporary storage area specific for image data.

The digital still camera 10 comprises an operation device 26 including a menu/OK key, a cross key, a cancel key, and a power button, in addition to a mode selection switch 22 and a release button 24. Signals from the operation sections (22 to 26) are inputted to the CPU 12. The CPU 12 controls the circuits of the digital still camera 10 in response to the input signals so as to perform lens driving control, picture taking control, image processing control, image data recording/reproduction control, and display control.

The mode selection switch 22 is an operation device for switching "picture taking mode" and "reproduction mode." When the mode selection switch 22 is operated to connect a movable contact piece 22A to a contact a, a signal from the movable contact piece 22A is inputted to the CPU 12 and the digital still camera 10 is set at "picture taking mode." Further, when the movable contact piece 22A is connected to a contact b, the digital still camera 10 is set at "reproduction mode" for reproducing a recorded image.

The release button 24 is an operation button for inputting an instruction to start photographing. The release button 24 is constituted of a 2-stroke switch having an S1 switch, which is turned on when being pressed halfway down, and an S2 switch, which is turned on when being pressed all the way down.

The menu/OK key is an operation key which serves as a menu button for instructing the screen of an image display device 28 to display a menu, and serves as an OK button for providing instructions to confirm and execute selected contents.

The cross key is an operation section for inputting instructions of four directions (right, left, up, down). The cross key acts as a button (cursor moving device) for selecting an item on a menu and providing an instruction to select settings on each menu. Further, the up/down key of the cross key acts as a zoom switch upon photographing or a reproduction zoom switch upon reproduction, and the left/right key acts as a frame advance (forward/backward) button in reproduction mode.

The cancel key acts as a button for providing an instruction to cancel an instruction or return to the previous operation.

The image display device 28 is constituted of a liquid crystal display capable of providing color displays. The image display device 28 can be used as an electronic finder for confirming an angle of view upon photographing and a device for reproducing and displaying a recorded image. Further, the image display device 28 is used as a user interface display screen. Information including menu information, selection items, and setting contents is displayed on the image display device 28 when necessary. A display device using other systems such as an organic EL display may be used instead of the liquid crystal display.

The digital still camera 10 has a medium socket (medium loading part) 30, in which a recording medium 32 can be loaded. The format of the recording medium is not particularly limited and thus various kinds of media are applicable which include xD-PictureCard (trademark), semiconductor memory card represented as smart media (trademark), a transportable small hard disk, a magnetic disk, an optical disk, and a magneto-optical disk.

A medium controller 34 performs signal conversion required for passing input/output signals suitable for the recording medium 32 loaded in the medium socket 30.

The picture taking function of the digital still camera 10 will be described below according to the present embodiment.

When picture taking mode is selected by the mode selection switch 22, power is supplied to a photographing section including a color CCD solid-state image sensing device (hereinafter referred to as CCD) 38 and thus photographing becomes possible.

A lens unit 40 is an optical unit which includes a photographic lens 42 including a focus lens and a mechanical shutter 44 used also as a diaphragm. The photographic lens 42 and the mechanical shutter 44 are motor driven by a lens driving section 46 and a diaphragm driving section 48. The lens driving section 46 and the diaphragm driving section 48 are driven and controlled by the CPU 12, so that zoom control, focus control, and iris control are performed.

Light passing through the lens unit 40 forms an image on the light-receiving surface of the CCD 38. A number of photodiodes (light-receiving elements) are two-dimensionally arranged on the light-receiving surface of the CCD 38 and primary color filters of red (R), green (G), and blue (B) are arranged in a predetermined layout (Bayer, G stripe, etc.) so as to correspond to the photodiodes. The CCD 38 has an electronic shutter function for controlling charge accumulation time (shutter speed) of the photodiodes, and the CPU 12 controls the charge accumulation time of the CCD 38 via a timing generator 50. An image pickup device of other systems such as MOS may be used instead of the CCD 38.

A subject image formed on the light-receiving surface of the CCD 38 is converted into signal charge according to an amount of incident light by the photodiodes. The signal charge accumulated in the photodiodes is read sequentially as a voltage signal (image signal) according to the signal charge based on a driving pulse which is applied from the timing generator 50 in response to an instruction of the CPU 12.

Signals outputted from the CCD 38 are transmitted to an analog processing section (CDS/AMP) 52, in which RGB signals of each pixel are sampled and held (correlated double sampling). Thereafter, the signals are amplified and applied to an AD converter 54.

The AD converter 54 converts the analog RGB signals outputted from the analog processing section 52 into digital RGB signals. Then, the digital RGB signals outputted from the AD converter 54 are stored in the memory 18 via an image input controller 56.

An image signal processing circuit 58 processes the RGB signals, which have been stored in the memory 18, according to an instruction of the CPU 12. That is, the image signal processing circuit 58 acts as an image processing device which includes a synchronization circuit (processing circuit which interpolates a spatial displacement of a color signal in a color filter arrangement of a single-panel CCD), a white balance correction circuit, a gamma correction circuit, an edge correction circuit, and a luminance/color difference generation circuit. The image signal processing circuit 58 performs predetermined signal processing according to a command from the CPU 12 while using the memory 18. The RGB signals inputted to the image signal processing circuit 58 are converted into a luminance signal (Y signal) and a color difference signal (Cr and Cb signals) in the image signal processing circuit 58 and are subjected to predetermined processing such as gamma correction. Thereafter, the signals are stored in the VRAM 20.

When a photographed image is outputted to the image display device 28, image data is read from the VRAM 20 and is transmitted to a video encoder 60. The video encoder 60 converts the inputted image data into a signal of a predetermined system for display (e.g., an NTSC color combined signal) and outputs the signal to the image display device 28. Thus, the photographed image is outputted to the image display device 28 and is displayed thereon.

An image signal is periodically captured from the CCD 38 and image data in the VRAM 20 is periodically rewritten and outputted to the image display device 28, so that a photographed picture is displayed on the image display device 28 in real time. A photographer can confirm a photographing angle of view by viewing the picture (through image) displayed on the image display device 28.

When the release button 24 is pressed halfway down to turn on the S1 switch, the digital still camera 10 starts AE and AF processing.

First, the image signal captured from the CCD 38 via the image input controller 56 is inputted to an AF detection circuit 62 and an AE/AWB detection circuit 64.

The AE/AWB detection circuit 64 divides one screen into a plurality of areas (e.g., 16×16). The AE/AWB detection circuit 64 includes a circuit for calculating the integrated value of RGB signals for each of the divided areas and provides the CPU 12 with the integrated value. The CPU 12 detects a brightness of a subject (subject brightness) based on the integrated value obtained from the AE/AWB detection circuit 64 and calculates an exposure value suitable for photographing (photographing EV). Then, the CPU 12 determines an f number and a shutter speed based on the calculated photographing EV and a predetermined program diagram and controls the mechanical shutter 44 and the electronic shutter of the CCD 38 according to the f number and the shutter speed to obtain a proper light exposure.

The AE/AWB detection circuit 64 calculates an average integrated value for each color of the RGB signals in each of the divided areas during automatic white balance adjustment, and the AE/AWB detection circuit 64 provides the CPU 12 with the calculation result. The CPU 12 calculates ratios of R/G and B/G for each of the divided areas based on the obtained integrated value R, integrated value B, and integrated value G. The CPU 12 identifies a light source type based on the distribution, etc. of color spaces R/G and B/G of the calculated values R/G and B/G. Then, according to a white balance adjustment value suitable for the identified light source type, for example, the CPU 12 controls a gain value (white balance correction value) for RGB signals of the white balance correction circuit and corrects a signal of each color channel so that each ratio is almost 1 (i.e., a ratio of integrated values of RGB is expressed by R:G:B≦1:1:1 in one screen).

The AF detection circuit 62 is constituted of a high-pass filter which permits only the passage of high-frequency components of a G signal, an absolute value processing section, an AF area extraction section which extracts a signal of a predetermined focus area (e.g., the center of the screen), and an integrating section which integrates absolute value data in an AF area. Integrated value data determined by the AF detection circuit 62 is informed to the CPU 12. The CPU 12 calculates focus evaluation values (AF evaluation values) on a plurality of AF detection points while controlling the lens driving section 46 to move the focus lens, and the CPU 12 determines, as a focal position, the lens position having the maximum evaluation value. Then, the CPU 12 controls the lens driving section 46 so as to move the focus lens to the determined focal position (so-called contrast AF).

As described above, when the release button 24 is pressed halfway down to turn on the S1 switch, AE/AF processing is performed. Thereafter, when the release button 24 is pressed all the way down to turn on the S2 switch, a photographing operation for recording is started. Image data obtained in response to the turning on of the S2 switch is converted into a luminance/color difference signal (Y/C signal) in the image signal processing circuit 58, is subjected to predetermined processing such as gamma correction, and is stored in the memory 18.

The image data stored in the memory 18 is compressed in a predetermined format (e.g., JPEG) by a compression/expansion circuit 66 and is recorded in the recording medium 32 via the medium controller 34 as an image file of a predetermined format. At this point, the image file is stored and recorded in a designated folder, out of folders having been created in the recording area of the recording medium 32. The structure of the folders created in the recording area of the recording medium 32 will be specifically described later.

When the mode selection switch 22 selects reproduction mode, the last image file recorded in the recording medium 32 (image file recorded last) is read. The read image file is expanded into an uncompressed YC signal via the compression/expansion circuit 66, converted into a signal for display via the image signal processing circuit 58 and the video encoder 60, and is outputted to the image display device 28. Therefore, the contents of the image data are displayed on the screen of the image display device 28.

By operating the right key or the left key of the cross key during the reproduction of one frame of a static image, it is possible to switch image data to be reproduced (forward/backward frame advance). An image file after frame advance is read from the recording medium 32 and a static image is similarly reproduced and displayed on the image display device 28.

The following will describe the function of managing image files in the digital still camera 10 of the present embodiment.

As described above, in the digital still camera 10 of the present embodiment, when image data obtained via the CCD 38 is recorded as an image file in the recording medium 32, the image data can be stored in a designated folder. The folder for storing the image file can be arbitrarily created by the user.

Figure 2:
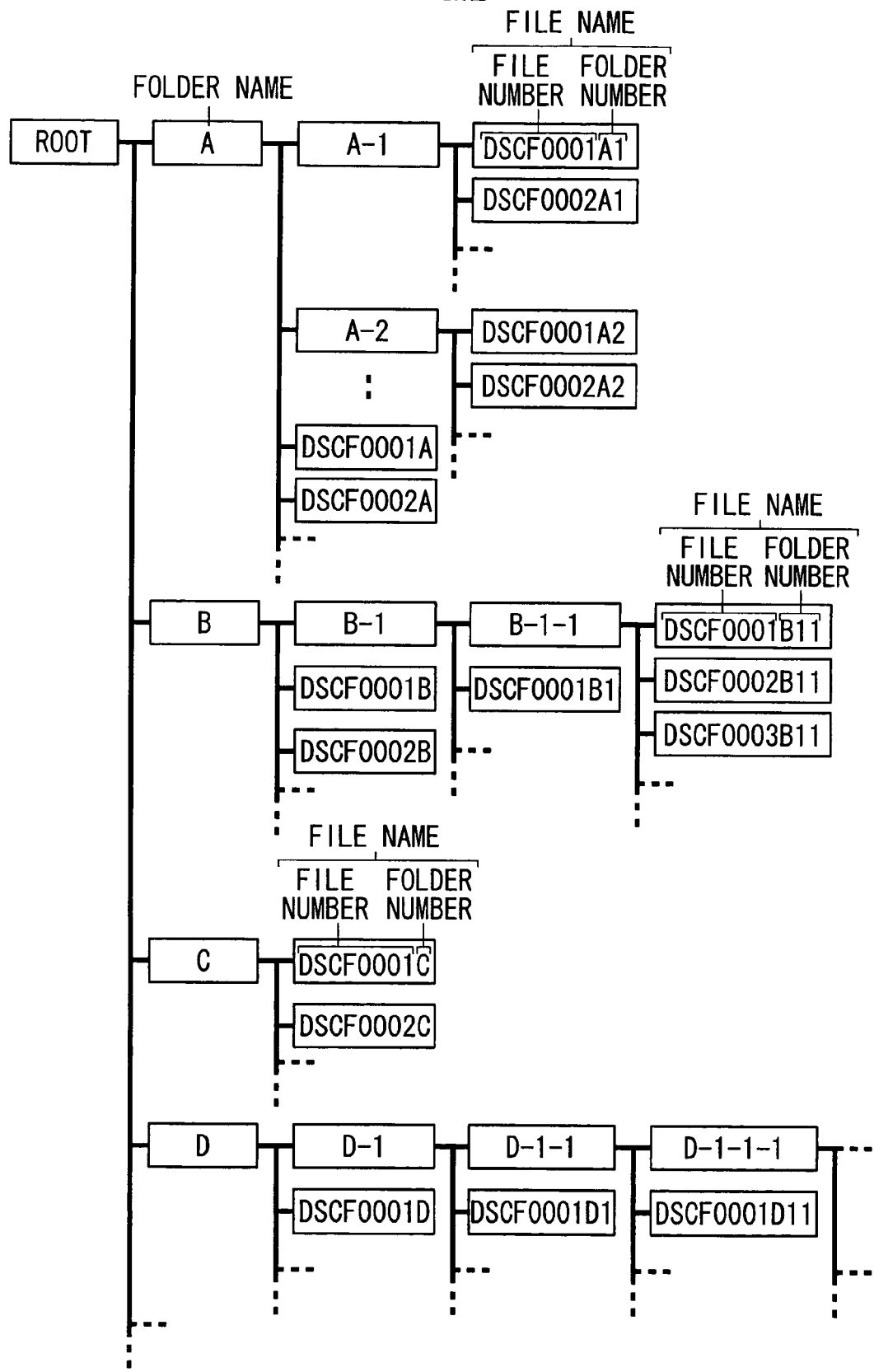
FIG. 2 is a conceptual illustration showing the structure of folders created in a recording area of a recording medium.

FIG. 2 is a conceptual illustration showing the structure of folders (directory) created in the recording area of the recording medium 32. As shown in FIG. 2, the folders can be hierarchically created. That is, the folders are hierarchically created under a root folder "ROOT" on the top. For example, nine-level hierarchy can be created at the maximum.

Folders created immediately below the root folder "ROOT" are configured as independent folders each of which has a folder name of one alphabet. For example, the folders are named as alphabets such as "A", "B", "C" . . . in the order of creation.

Further, folders created immediately below the independent folders "A", "B", "C" . . . have names which are the combinations of "A", "B", "C" . . . of the independent folders serving as upper folders, "hyphen (-)", and "numbers." For example, folders created immediately below the independent folder "A" are named as "A-1", "A-2", and folders created immediately below the independent folder "B" are named as "B-1", Similarly, folders created immediately below the independent folders "A-1", "A-2", . . . have names which are the combinations of the folder names "A-1", "A-2", . . . of the upper folders, "hyphen (-)", and "numbers." For example, folders immediately below the folder "A-1" are named as "A-1-1", "A-1-2", . . . and folders immediately below the folder "B-1" are named as "B-1-1", "B-1-2", . . .

In this way, in each lower level, folders have the names of the upper level folders that are combined with hyphens and numbers. Therefore, a folder name indicates from which and how a folder branches out.

An image file can be stored in a designated folder of the hierarchically created folders. Thus, it is possible to sort and record image files according to the object of photographing.

Image files stored in each folders are individually named by the CPU 12. Each file has a name specific to a folder so that file names do not overlap in the same recording medium. That is, a file name is the combination of "file number (DSCF****)," which is provided in the recording order in each folder, and "folder number" in which hyphen (-) is removed from the "folder name" of a folder for recording a file.

For example, as shown in FIG. 2, in the case of an image file to be stored in the folder "A-1", when the image file is the first one to be recorded in the folder "A-1," the image file is named as "DSCF0001A1" which is the combination of a file number "DSCF0001" and a folder number "A1." When an image file is the second one to be recorded in the folder "A-1," the image file is named as "DSCF0002A1" which is the combination of a file number "DSCF0002" and a folder number "A1."

Similarly, in the case of an image file to be stored in the folder "A", when the image file is the first one to be recorded in the folder "A," the image file is named as "DSCF0001A" which is the combination of a file number "DSCF0001" and a folder number "A." When an image file is the second one to be recorded in the folder "A," the image file is named as "DSCF0002A" which is the combination of a file number "DSCF0002" and a folder number "A."

Similarly, in the case of an image file to be stored in the folder "B-1-1", when the image file is the first one to be recorded in the folder "B-1-1," the image file is named as "DSCF0001B11" which is the combination of a file number "DSCF0001" and a folder number "B11." When an image file is the second one to be recorded in the folder "B-1-1," the image file is named as "DSCF0002B11" which is the combination of a file number "DSCF0002" and a folder number "B11."

Similarly, in the case of an image file to be stored in the folder "C", when the image file is the first one to be recorded in the folder "C," the image file is named as "DSCF0001C" which is the combination of a file number "DSCF0001" and a folder number "C." When an image file is the second one to be recorded in the folder "C," the image file is named as "DSCF0002C" which is the combination of a file number "DSCF0002" and a folder number "C."

In this way, an image file stored in each folder has a name specific to a folder so that file names do not overlap in the same recording medium. Thus, even when an image file is acquired to a personal computer and so on, it is possible to prevent erroneous overwriting of data with the same file name.

Since the files are named in the above-described manner, the user can recognize, only by looking at a file name, a folder which stores a file at a glance. That is, the file name of an image file is the combination of a file number and a folder number and thus the user can recognize, only by looking at a folder number in the rear, a folder which records an image file at a glance.

Figure 3:
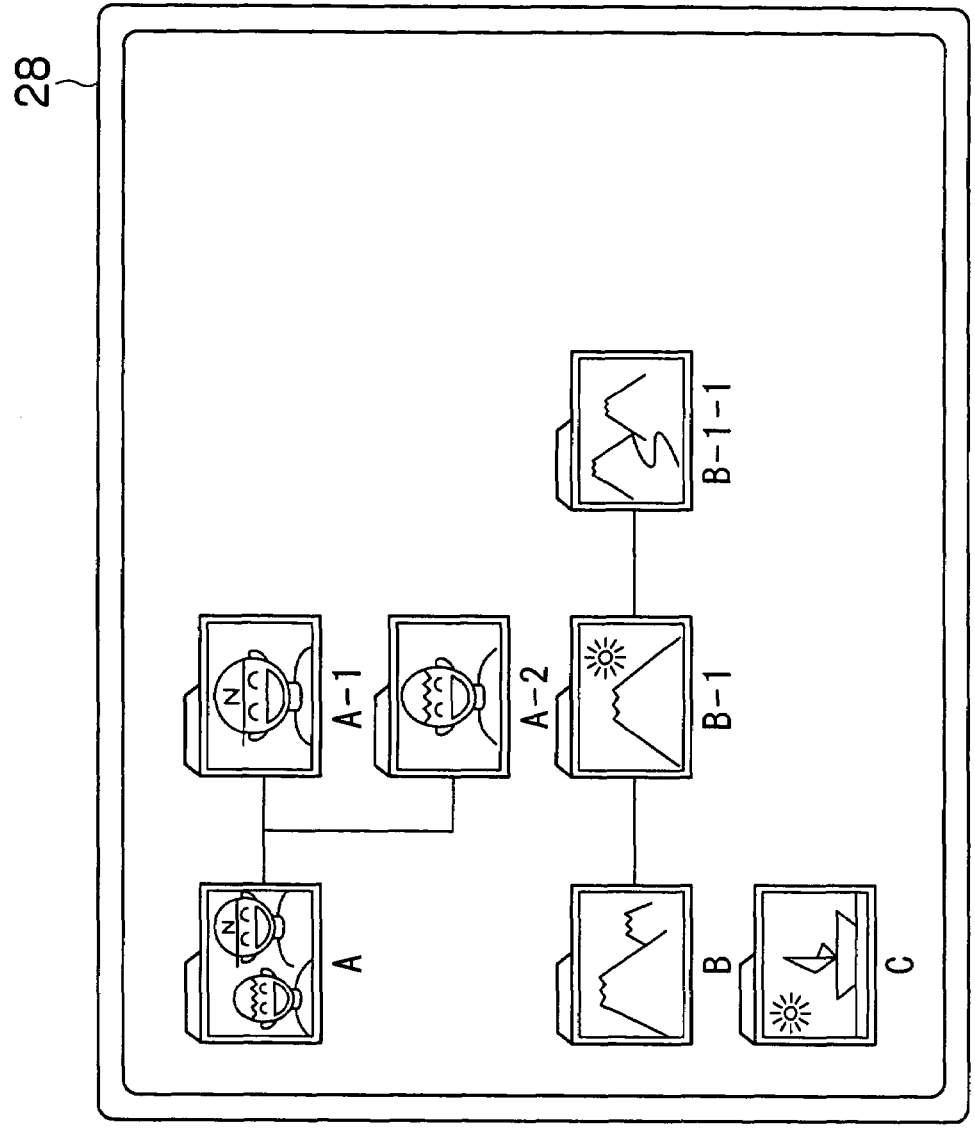
FIG. 3 is a diagram showing a display example of a list of folders displayed on an image display device.

As described above, the digital still camera 10 of the present embodiment enables the user to create folders for recording image files, designate any folder out of the created folders, and record photographed image data. As shown in FIG. 3, a folder is designated from a list of folders which are displayed with folder icons on the screen of the image display device 28.

As shown in FIG. 3, the folder list is hierarchically displayed. Folders of each level expand from the left to right of the screen. In this case, folders on the same level are displayed in the same line (column). In the example of FIG. 3, folders "A", "B", and "C" are on the same level and thus the folder icons of the folders are arranged in the same column. Further, the folder icons of folders "A-1", "A-2", and "B-1" on a lower level are arranged in a column on the right of the folders "A", "B", and "C".

As shown in FIG. 3, images (icon images) are displayed on folder icons which indicate folders. The icon image on the folder makes it possible to confirm the contents of the folder. The folder icon is created concurrently with the folder. The creating method and the editing method of the folders and the icons will be described below.

The folders are created while a camera mode is set at "folder creation mode." "Folder creation mode" is set from the menu.

Figure 4A:
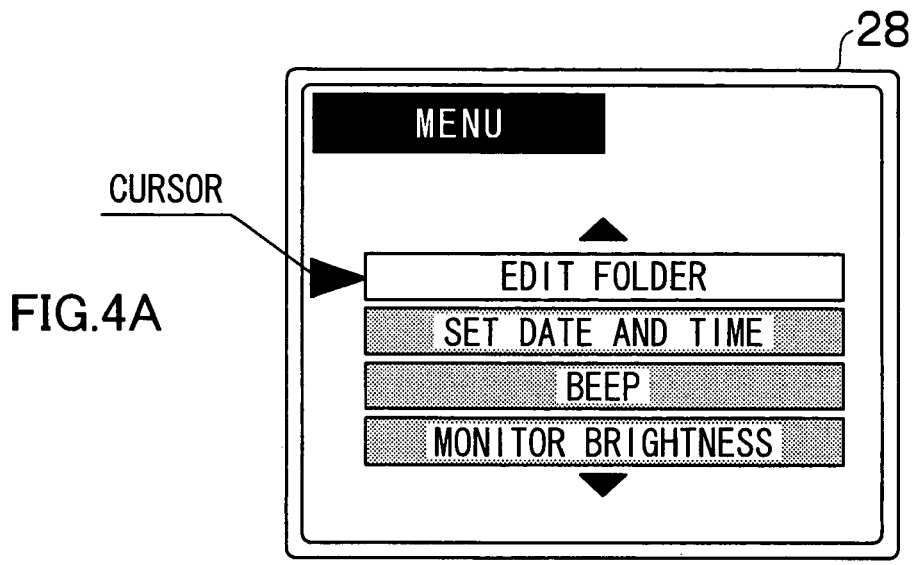
FIGS. 4A to 4C are diagrams showing display examples of a menu.
Figure 4B:
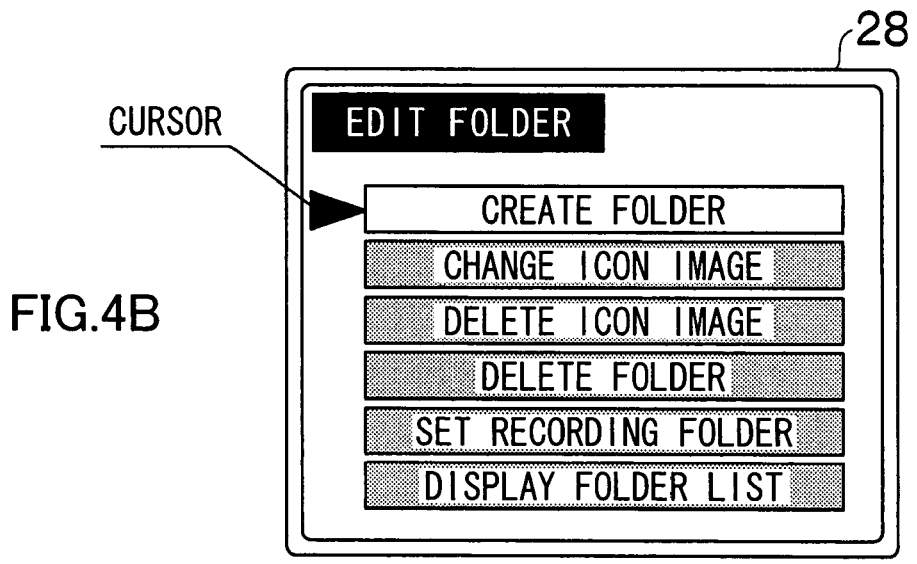

FIG. 4 is a display example of the menu. As shown in FIG. 4, when the camera mode is set at "picture taking mode" or "reproduction mode" and the menu/OK key is pressed, the CPU 12 detects the press and causes the image display device 28 to display the menu as shown in FIG. 4A. When "edit folder" is selected from menu items displayed on the menu, the screen of the image display device 28 is switched to the menu of "edit folder" as shown in FIG. 4B. "Folder creation mode" is set by selecting "create folder" from menu items displayed on the menu of "edit folder."

The menu items displayed on the menu of "edit folder" has "change icon image" for changing the icon image of a created folder (icon image change mode), "delete icon image" for deleting the icon image of a created folder (icon image deletion mode), "delete folder" for deleting a created folder (folder deletion mode), "set recording folder" for designating a folder for storing photographed image data (recording folder setting mode), and "display folder list" for displaying a list of folders created in the recording area of the recording medium 32 (folder list display mode). These modes will be specifically described later.

Further, a menu item is selected by moving a cursor to a desired item with the cross key and is confirmed by pressing the menu/OK key.

As described above, the digital still camera 10 can create a folder by setting a camera mode at "folder creation mode." "Folder creation mode" set in "picture taking mode" is different from "folder creation mode" set in "reproduction mode" in the subsequent process of creating a folder and a folder icon. That is, when a transition is made to "folder creation mode" in "picture taking mode," a new folder is created by photographing and an image obtained by photographing is displayed as an icon image on a folder icon. On the other hand, when a transition is made to "folder creation mode" in "reproduction mode," a new folder is created by selecting a photographed image and the selected image is displayed as an icon image on a folder icon.

First, the following will describe processing when the camera is put into "folder creation mode" in "picture taking mode."

Figure 4C:
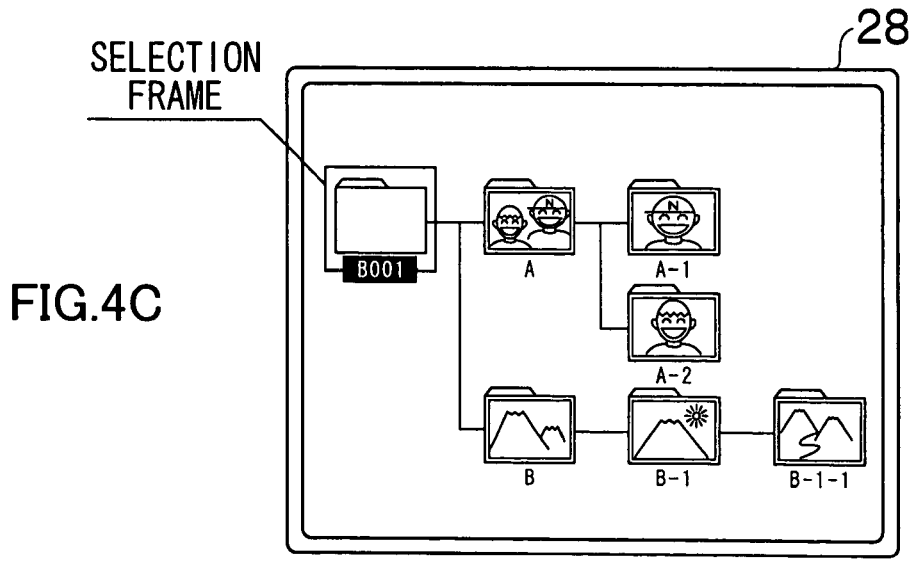

As described above, the menu/OK key is pressed when a camera mode is set at "picture taking mode," "edit folder" is selected from the menu displayed on the image display device 28, and "create folder" is selected from the menu of "edit folder", so that the digital still camera 10 is set at "folder creation mode" in "picture taking mode." Then, the camera is put into "folder creation mode," so that a list of folders is displayed with folder icons on the screen of the image display device 28 as shown in FIG. 4C.

From the displayed list of folders, the user selects a folder under which a new folder should be created. For example, when creating a new folder under the root folder "ROOT," the user selects the root folder "ROOT." Similarly when a new folder is created under the folder "A", the user selects the folder "A". Selection is made by moving a selection frame with the cross key and confirmation is made by pressing the menu/OK key. In this case, a new folder is created under the root folder "ROOT."

Figure 5A:
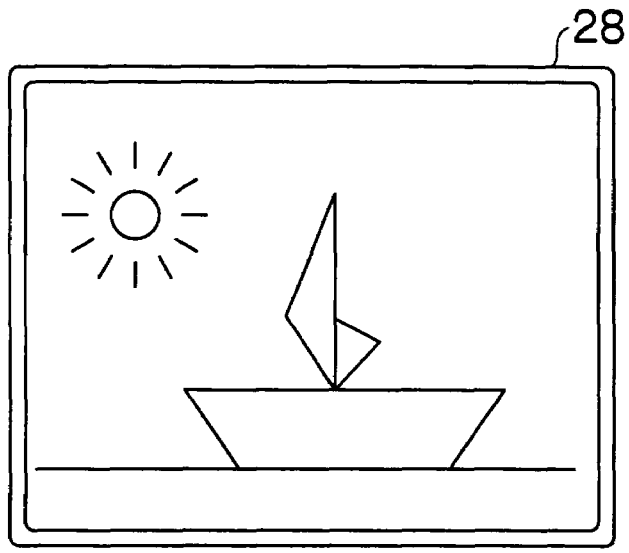
FIGS. 5A to 5C are explanatory views showing "folder creation mode" in "picture taking mode"

Thereafter, as shown in FIG. 5A, a through image is displayed on the screen of the image display device 28. That is, when a folder is selected, the CPU 12 detects the selection and controls the circuits so as to display the through image on the image display device 28. In this state, the user photographs an image for an icon image. Photographing is performed by pressing the release button 24 as in ordinary cases.

Figure 5B:
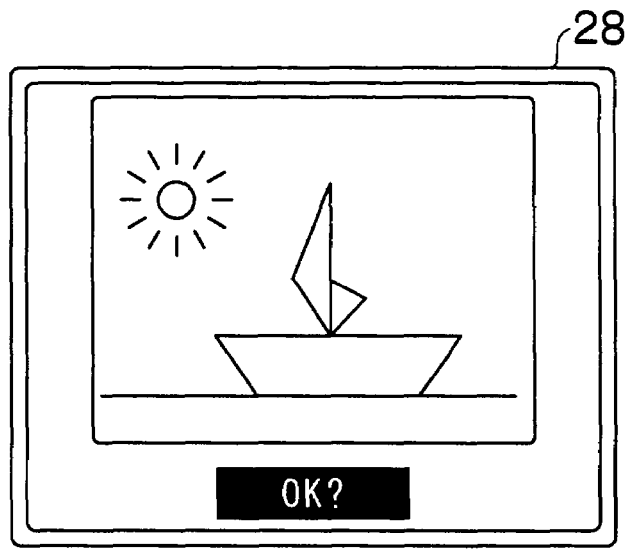

Then, when the user presses the release button 24, the CPU 12 detects the press and captures the image. The CPU 12 causes the image display device 28 to preview the captured image as shown in FIG. 5B. When the user looks at the previewed image and decides to use the image as an icon image, the user presses the menu/OK key. When another image is photographed, the user presses the cancel key. When the cancel key is pressed, the image display device 28 displays a through image again and the digital still camera 10 goes into a stand-by state for photographing.

On the other hand, when the menu/OK key is pressed, a new folder (folder "C") is created under the selected folder (root folder "ROOT") and the image data of an image (icon image) displayed on the folder icon of the folder is created based on photographed image data. Then, information about the newly created folder and icon image (folder management information) is recorded in the EEPROM 17. The folder management information is rewritten every time a folder is created or deleted or an icon is changed.

The new folder is created immediately below the root folder "ROOT". Since the folder "A" and the folder "B" have been already created immediately below the root folder "ROOT," the newly created folder is named as an alphabet "C".

Figure 5C:
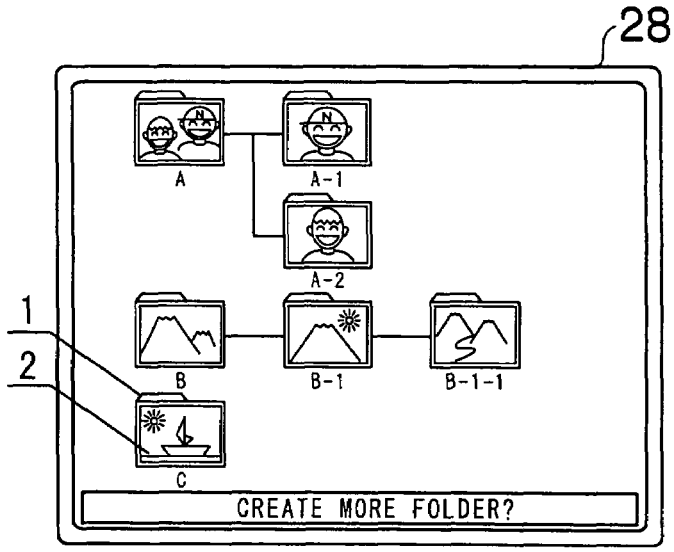

When the folder is created in this manner, as shown in FIG. 5C, a list of folders created in the recording area of the recording medium 32 at present is displayed along with the newly created folder on the screen of the image display device 28, by using folder icons based on the folder management information. By looking at the folder list displayed with the folder icons on the image display device 28, the user can recognize the structure of folders created in the recording area of the recording medium 32 at present and the contents of stored folders.

As shown in FIG. 5C, the folder icon is displayed on the image display device 28 with an icon image 2 attached inside a folder icon 1 having a predetermined appearance.

In the series of operations, a folder is newly created in a predetermined folder and the icon image of the folder is created. When another folder is subsequently created, the menu/OK key is pressed while the folder list of FIG. 5C is displayed. When the processing is completed, the cancel key is pressed. When the cancel key is pressed, the CPU 12 detects the press, finishes the creation of a folder, and puts the camera into normal "picture taking mode."

On the other hand, when the menu/OK key is pressed, the CPU 12 detects the press, switches the display of the image display device 28 to a through image, and returns the digital still camera 10 to the stand-by state for photographing. When the release button 24 is pressed thereafter, the CPU 12 detects the press, captures an image, and previews the captured image on the image display device 28. When the user looks at the previewed image and uses the image as an icon image, the menu/OK key is pressed. When another image is photographed, the cancel key is pressed. When the cancel key is pressed, the image display device 28 displays a through image again and the digital still camera 10 goes to the stand-by state for photographing.

On the other hand, when the menu/OK key is pressed, a folder "C-1" is newly created under the newly created folder "C" and the icon image of the newly created folder "C-1" is created based on a photographed image. Then, the folder management information recorded in the EEPROM 17 is updated and a list of folders created in the recording area of the recording medium 32 at present is displayed with folder icons on the image display device 28 based on the updated folder management information.

In this way, when folders are successively created in "folder picture taking mode," another folder is newly created under a newly created folder. That is, folders are created in a hierarchical manner.

The following will describe processing when the camera is put into "folder creation mode" in "reproduction mode."

As described above, when the menu/OK key is pressed while the camera is put into "reproduction mode," "edit folder" is selected from the menu displayed on the image display device 28, and then "create folder" is selected from the menu of "edit folder." In this case, the digital still camera 10 is set at "folder creation mode" in "reproduction mode." Then, when the camera is put into "folder creation mode," a list of folders is displayed with folder icons on the screen of the image display device 28 (FIG. 4C). From the list of folders, the user selects a folder under which a new folder should be created. In this case, a new folder is created under the root folder "ROOT."

Figure 6A:
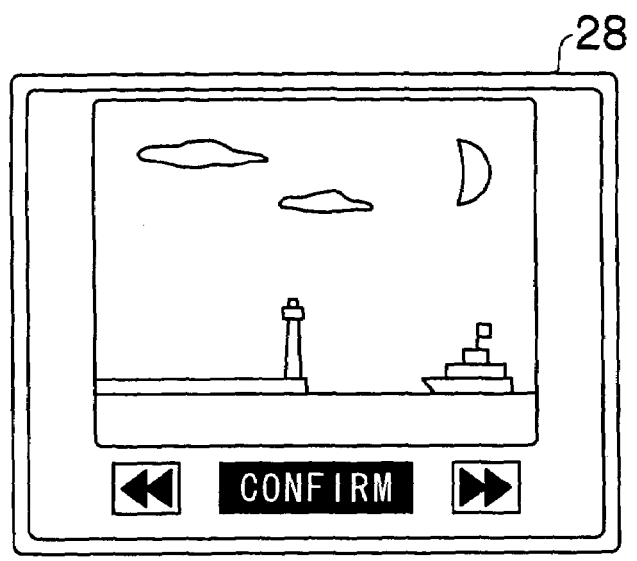
FIGS. 6A to 6C are explanatory views showing "folder creation mode" in "reproduction mode"

Thereafter, as shown in FIG. 6A, an image recorded in the recording medium 32 is reproduced and displayed on the screen of the image display device 28. That is, when a folder is selected, the CPU 12 detects the selection and controls the circuits so as to reproduce and display the photographed image on the image display device 28.

In this case, for example, images are reproduced in the alphabetical order of the folder names. That is, in the example of FIG. 4C, an image file stored in the folder "A" is reproduced and displayed. Subsequently, the folder "A-1", folder "A-2", folder "B", folder "B-1", and folder "B-1-1" are reproduced and displayed in this order. Frame advance is performed by the right and left buttons of the cross key. Forward frame advance is made by pressing the right button and backward frame advance is made by pressing the left button.

In this way, the user sequentially reproduces and displays image files recorded in the recording medium 32 on the image display device 28. Then, when an image to be used as an icon image is displayed on the image display device 28, the user presses the menu/OK key.

Figure 6B:
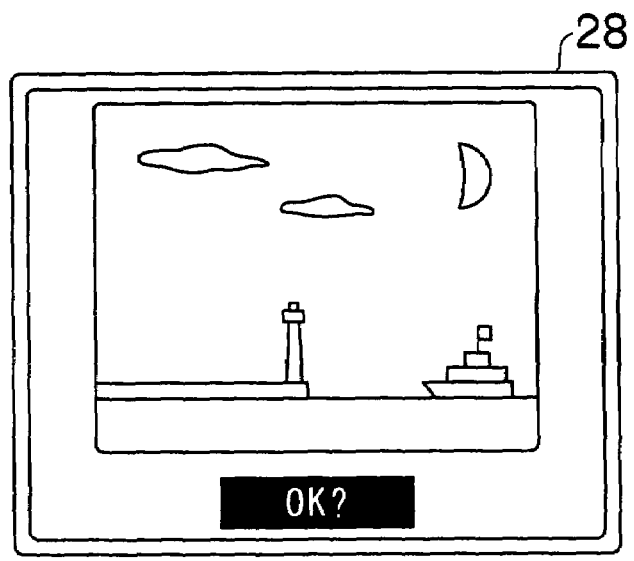

When the menu/OK key is pressed, as shown in FIG. 6B, the selected image is displayed again on the image display device 28. When the image displayed on the image display device 28 is used as an icon image, the menu/OK key is pressed. When another image is selected, the cancel key is pressed. When the cancel key is pressed, a recorded image is reproduced and displayed again on the image display device 28 and waits for selection.

On the other hand, when the menu/OK key is pressed, a new folder (folder "C") is created under the selected folder (root folder "ROOT"). Then, the image data of the icon image of the newly created folder is created based on the image data of the selected image.

The new folder is created immediately below the root folder "ROOT." Since the folder "A" and the folder "B" have been already created immediately below the root folder "ROOT," the newly created folder is named as an alphabet "C".

Figure 6C:
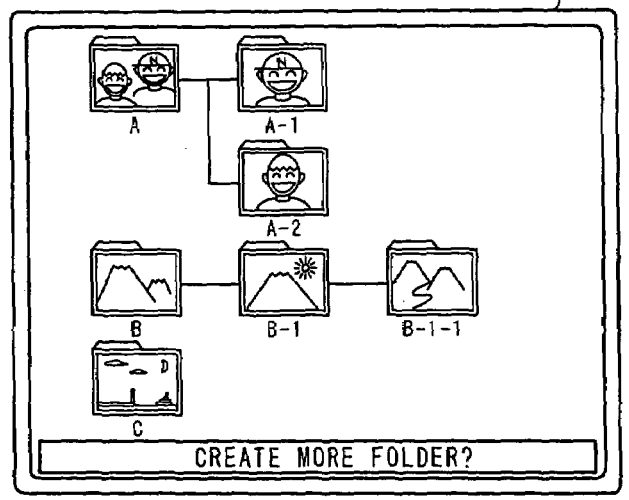

When the folder and the icon image are created in this manner, the folder management information recorded in the EEPROM 17 is updated. Then, as shown in FIG. 6C, a list of folders created in the recording area of the recording medium 32 at present is displayed with folder icons on the image display device 28 based on the updated folder management information.

In the series of operations, a folder is newly created in a predetermined folder and the icon image of the folder is created. Thereafter, when another folder is subsequently created, the menu/OK key is pressed in the state of FIG. 6C where the folder list is displayed. When the processing is completed, the cancel key is pressed. When the cancel key is pressed, the CPU 12 detects the press, finishes the creation of folders, and puts the camera into normal "reproduction mode."

On the other hand, when the menu/OK key is pressed, the CPU 12 detects the press and causes the image display device 28 to reproduce and display a recorded image. Thereafter, when the menu/OK key is pressed to select an image to be used as an icon image, the CPU 12 detects the selection and causes the image display device 28 to display the selected image again. When the user looks at the image displayed on the image display device 28 and decides to use the image as an icon image, the user presses the menu/OK key. When another image is selected, the user presses the cancel key. When the cancel key is pressed, a recorded image is reproduced and displayed again on the image display device 28 and the digital still camera 10 waits for selection.

On the other hand, when the menu/OK key is pressed, a folder "C-1" is newly created under the newly created folder "C" and the icon image of the newly created folder "C-1" is created based on a photographed image. Then, the folder management information recorded in the EEPROM 17 is updated and a list of folders created in the recording area of the recording medium 32 at present is displayed on the image display device 28 based on the updated folder management information.

When folders are successively created thus in "folder picture taking mode," another folder is newly created under a newly created folder as in the case of picture taking mode.

As described above, when the camera is set at "folder creation mode" in "picture taking mode" or "reproduction mode," a folder is created according to each of the modes.

The following will describe the procedure of "icon image change mode" for changing the icon image of a created folder.

Figure 7A:
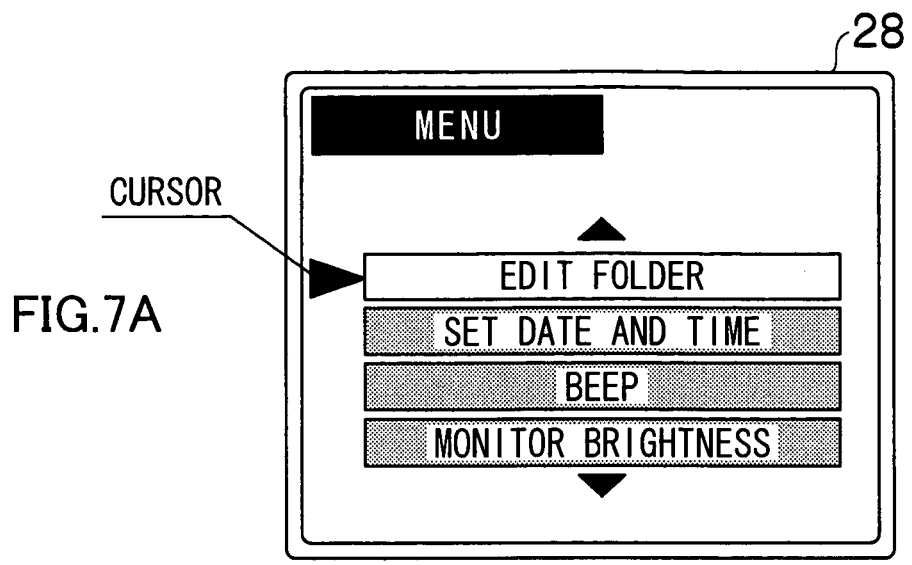
FIGS. 7A to 7C are diagrams showing display examples of the menu.

As described above, "icon image change mode" is set from the menu. That is, when the menu/OK key is pressed while the camera is set at "picture taking mode" or "reproduction mode," the image display device 28 displays the menu (FIG. 7A). "Edit folder" is selected from the menu and "change icon image" is selected from the menu of "edit folder" (FIG. 7B), so that the camera mode is set at "icon image change mode."

As in "folder creation mode," "icon image change mode" set in "picture taking mode" is different from "icon image change mode" set in "reproduction mode" in the subsequent procedure of changing an icon. That is, when a transition is made to "icon image change mode" in "picture taking mode," a new icon image is created based on an image photographed on the spot. When a transition is made to "icon image change mode" in "reproduction mode," a new icon is created based on an image selected from photographed images.

First, the following will describe processing when a transition is made to "icon image change mode" in "picture taking mode."

Figure 7B:
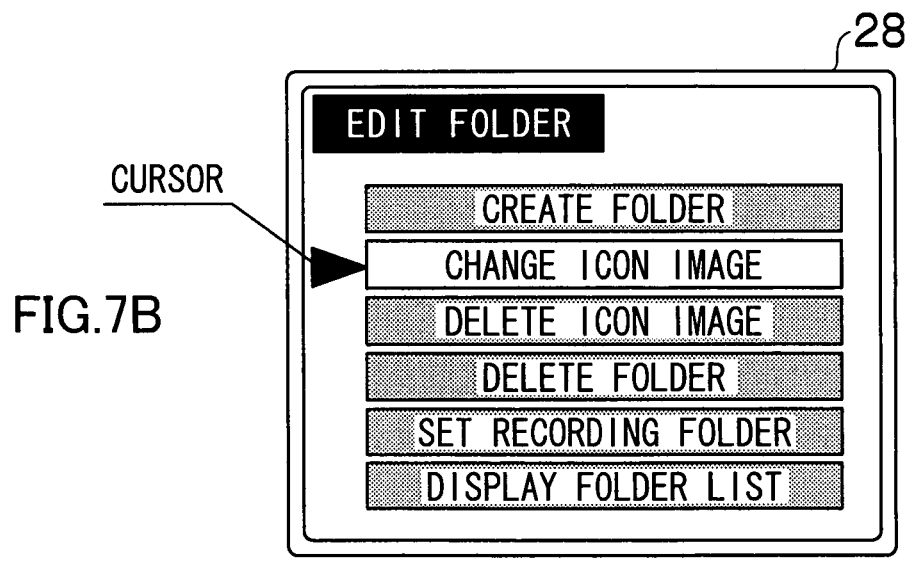

When the menu/OK key is pressed while the camera mode is set at "picture taking mode" as in the icon creation mode, the image display device 28 displays the menu as shown in FIG. 7A. The user selects "edit folder" from menu items displayed on the menu. When "edit folder" is selected, as shown in FIG. 7B, the display of the image display device 28 is switched to the menu of "edit folder." The user selects "change icon image" from the menu items of "edit folder."

Figure 7C:
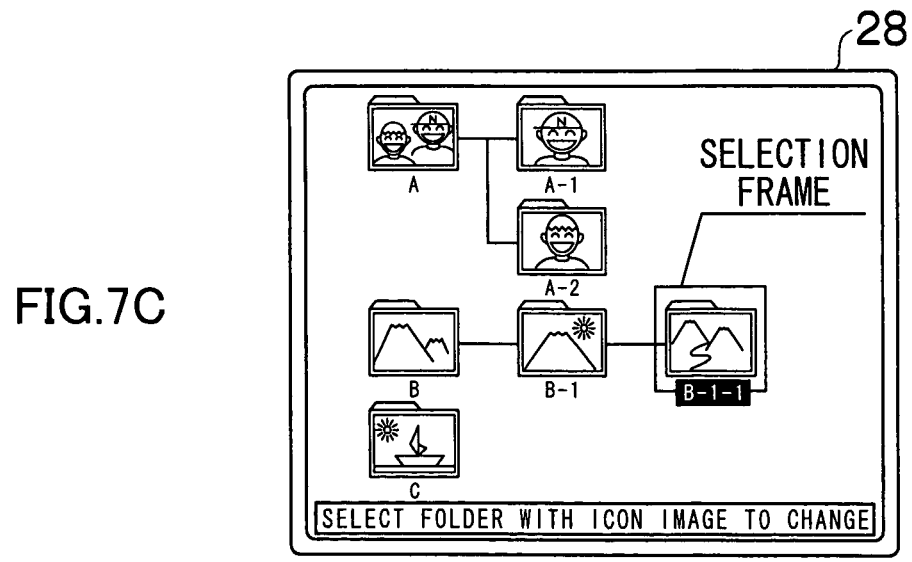

When "change icon image" is selected from the menu items of "edit folder," the digital still camera 10 is set at "icon image change mode" in "picture taking mode." Then, when the camera is put into "icon image change mode," as shown in FIG. 7C, a list of folders is displayed with folder icons on the screen of the image display device 28. From the list of folders displayed on the image display device 28, the user selects a folder having an icon image to be changed. For example, when the icon image of the folder "A" is changed, the folder "A" is selected. When the icon image of the folder "A-1" is changed, the folder "A-1" is selected. A selection is made by moving the selection frame with the cross key and a confirmation is made by pressing the menu/OK key. In this case, the icon image of a folder "B-1-1" is changed.

Figure 8A:
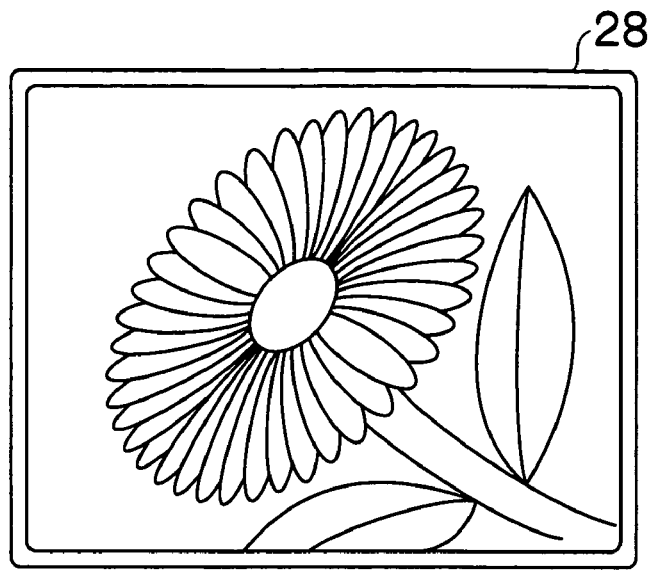
FIGS. 8A to 8C are explanatory views showing "icon image change mode" in "picture taking mode"

Thereafter, as shown in FIG. 8A, a though image is displayed on the screen of the image display device 28. That is, when a folder is selected, the CPU 12 detects the selection and controls the circuits so as to display the through image on the image display device 28. The user photographs an image for an icon image in this state. Photographing is performed by pressing the release button 24 as usual.

Figure 8B:
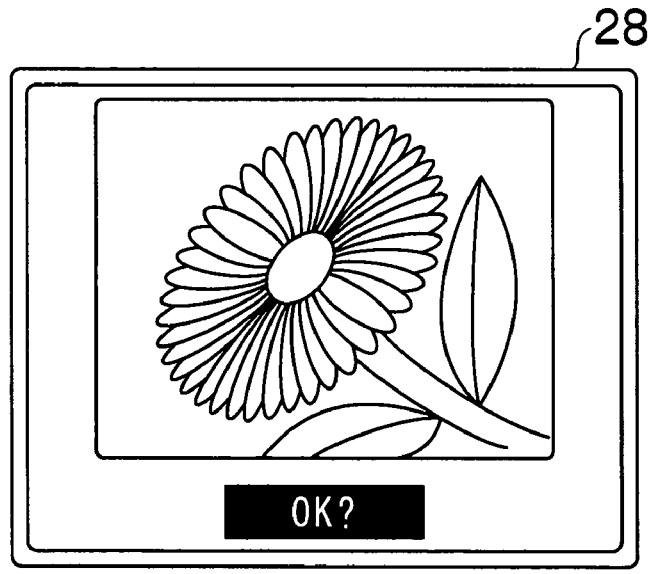

Then, when the user presses the release button 24, the CPU 12 detects the press and captures the image. The CPU 12 causes the image display device 28 to preview the captured image as shown in FIG. 8B. When the user looks at the previewed image and decides to use the image as an icon image, the user presses the menu/OK key. When another image is photographed, the cancel key is pressed. When the cancel key is pressed, the image display device 28 displays a through image again and the digital still camera 10 goes into a stand-by state for photographing.

Figure 8C:
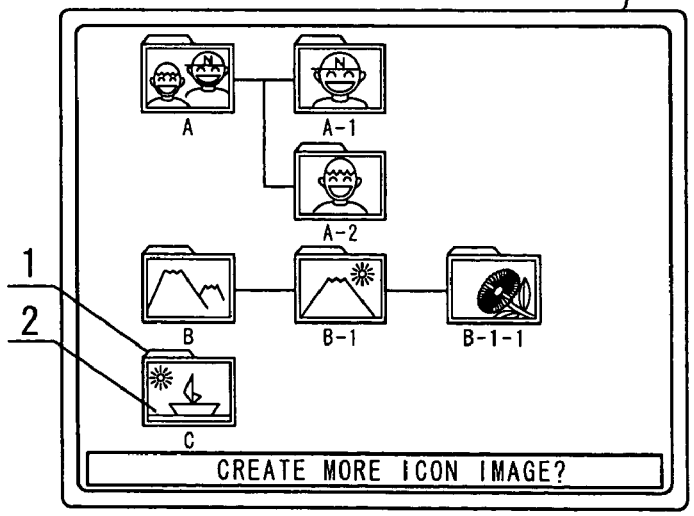

On the other hand, when the menu/OK key is pressed, an icon image is newly created based on the photographed image and the folder management information recorded in the EEPROM 17 is updated. That is, the information about the icon image of the selected folder is overwritten by the newly created icon image. Then, as shown in FIG. 8C, a list of folders created in the recording area of the recording medium 32 is displayed with folder icons on the image display device 28 by using the newly created icon image.

In the series of operations, the icon image of a predetermined folder is changed. Thereafter, when another icon image is subsequently changed, the menu/OK key is pressed while the folder list of FIG. 8C is displayed. When the processing is completed, the cancel key is pressed. When the cancel key is pressed, the CPU 12 detects the press, finishes the changing of an icon image, and puts the camera into normal "picture taking mode."

The following will describe processing when a transition is made to "icon image change mode" in "reproduction mode."

As described above, the menu/OK key is pressed when the camera is put into "reproduction mode," "edit folder" is selected from the menu displayed on the image display device 28, and then "change icon image" is selected from the menu of "edit folder." In this case, the digital still camera 10 is set at "icon image change mode" in "reproduction mode." Then, when the camera is put into "icon image change mode," a list of folders is displayed with folder icons on the screen of the image display device 28 as in the case of picture taking mode (FIG. 7C). From the list of folders, the user selects a folder having an icon image to be changed. In this case, the icon image of the folder "B-1-1" is changed.

Figure 9A:
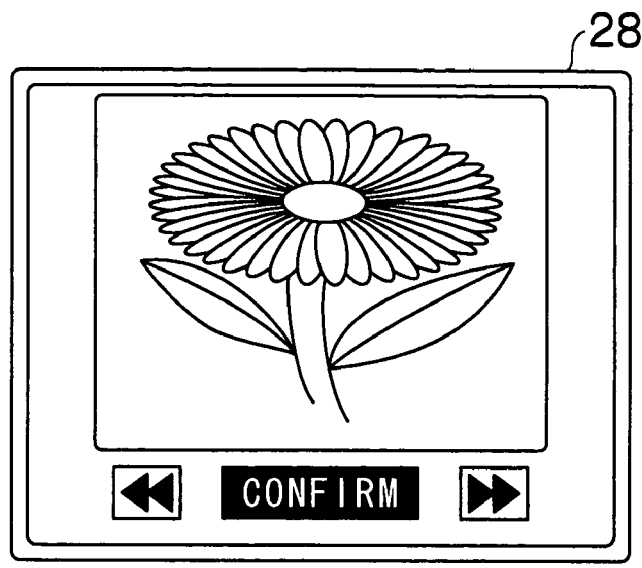
FIGS. 9A to 9C are explanatory views showing "icon image change mode" in "reproduction mode"

Thereafter, as shown in FIG. 9A, an image recorded in the recording medium 32 is reproduced and displayed on the screen of the image display device 28. That is, when a folder is selected, the CPU 12 detects the selection and controls the circuits so as to reproduce and display the photographed image on the image display device 28. As in "folder creation mode," images are reproduced in the alphabetical order of the folder names. The frame advance of the images is performed by the right and left buttons of the cross key. Forward frame advance is made by pressing the right button and backward frame advance is made by pressing the left button.

In this way, the user sequentially reproduces and displays image files recorded in the recording medium 32 on the image display device 28. Then, when an image to be used as an icon image is displayed on the image display device 28, the user presses the menu/OK key.

Figure 9B:
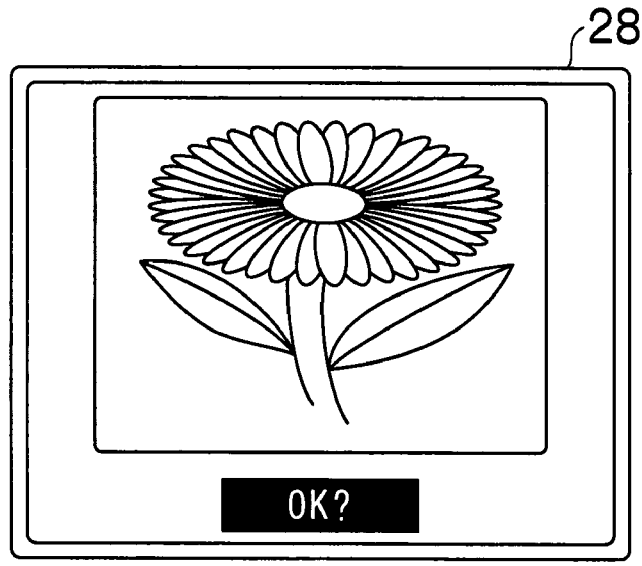

When the menu/OK key is pressed, as shown in FIG. 9B, the selected image is displayed again on the image display device 28. When the image displayed on the image display device 28 is used as a new icon, the menu/OK key is pressed. When another image is selected, the cancel key is pressed. When the cancel key is pressed, a recorded image is reproduced and displayed again on the image display device 28 and waits for selection.

Figure 9C:
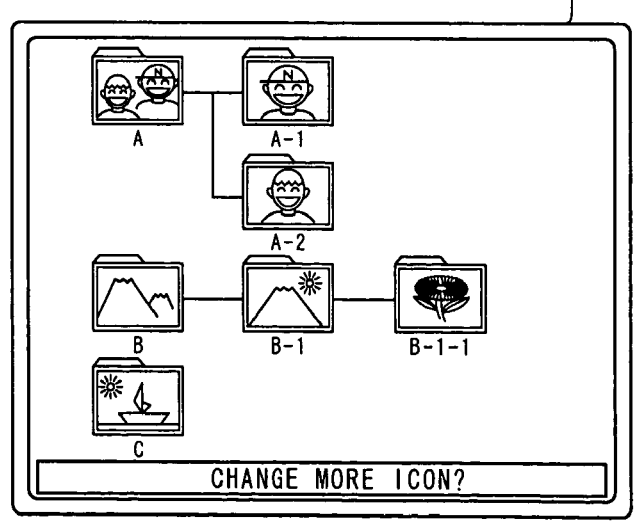

On the other hand, when the menu/OK key is pressed, an icon image is newly created based on the photographed image and the folder management information recorded in the EEPROM 17 is updated. That is, information about the icon image of the selected folder is overwritten by information about the newly created icon image. Then, as shown in FIG. 9C, a list of folders created in the recording area of the recording medium 32 is displayed on the image display device 28 by using the newly created icon.

In the series of operations, the icon image of the predetermined folder is changed. Thereafter, when another icon image is subsequently changed, the menu/OK key is pressed while the folder list is displayed as shown in FIG. 9C. When the processing is completed, the cancel key is pressed. When the cancel key is pressed, the CPU 12 detects the press, finishes changing folders, and puts the camera into normal "reproduction mode."

As described above, when the camera mode is set at "icon image change mode" in "picture taking mode" or "reproduction mode," an icon image is changed according to each of the modes.

The following will describe the procedure of "icon image deletion mode" for deleting the icon image of a created folder.

"Icon image deletion mode" is set from the menu. That is, when the menu/OK key is pressed while the camera mode is set at "picture taking mode" or "reproduction mode," the image display device 28 displays the menu (FIG. 7A). The user selects "edit folder" from menu items displayed on the menu. When "edit folder" is selected, the display of the image display device 28 is switched to the menu of "edit folder" (FIG. 7B). Then, the user selects "delete icon image" from the menu items of "edit folder." Thus, the camera is set at "icon image deletion mode."

Figure 10A:
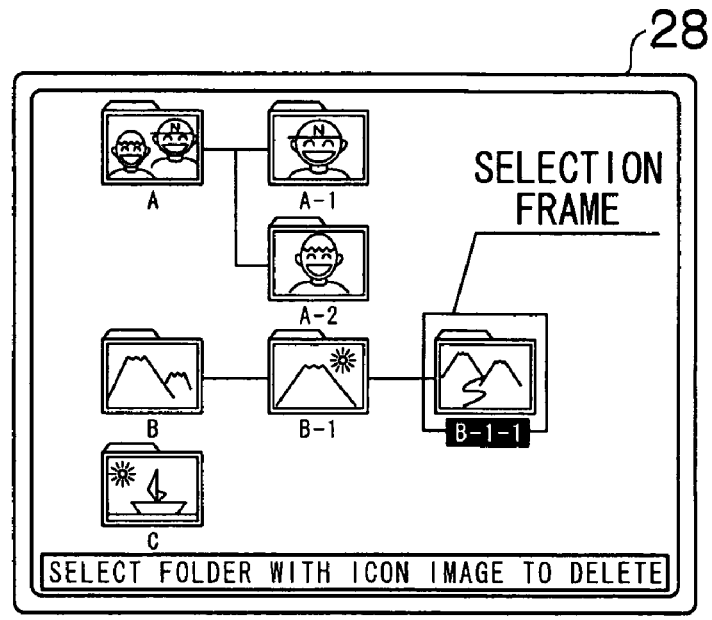
FIGS. 10A to 10B are explanatory views showing "icon image deletion mode"

When the camera mode is set at "icon image deletion mode," as shown in FIG. 10A, a list of folders created in the recording area of the recording medium 32 is displayed with folder icons on the image display device 28. From the list of folders displayed on the image display device 28, the user selects a folder having an icon image to be deleted. For example, when the icon image of the folder "A" is deleted, the folder "A" is selected. When the icon image of the folder "A-1" is deleted, the folder "A-1" is selected. A selection is made by moving the selection frame with the cross key and a confirmation is made by pressing the menu/OK key. In this case, the icon image of the folder "B-1-1" is deleted.

Figure 10B:
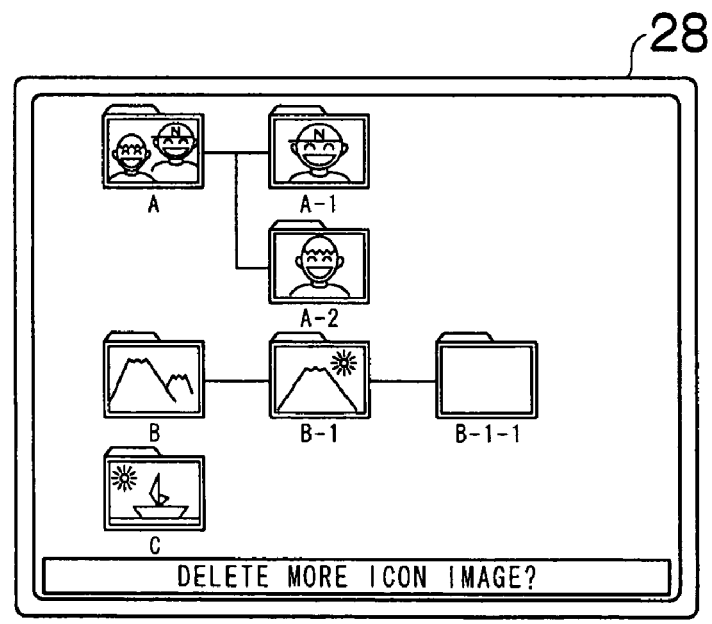

When a folder having an icon image to be deleted is selected and the menu/OK key is pressed, the CPU 12 deletes the icon image of the selected folder. That is, information about the icon image of the selected folder is deleted from the folder management information recorded in the EEPROM 17. Then, as shown in FIG. 10B, a list of folders created in the recording area of the recording medium 32 is displayed on the image display device 28 based on the updated folder management information.

In the series of operations, the icon image of a folder is deleted. Thereafter, when another icon image is subsequently changed, the menu/OK key is pressed while the folder list of FIG. 10B is displayed. When the processing is completed, the cancel key is pressed. When the cancel key is pressed, the CPU 12 detects the press, finishes the deletion of an icon image, and puts the camera into a mode before a transition is made to "icon image delete mode," that is, "imaging mode" or "reproduce mode."

The following will describe the procedure of "folder deletion mode" for deleting a created folder.

"Folder deletion mode" is set from the menu. That is, when the menu/OK key is pressed while the camera mode is set at "picture taking mode" or "reproduction mode," the image display device 28 displays the menu (FIG. 7A). The user selects "edit folder" from menu items displayed on the menu. When "edit folder" is selected, the display of the image display device 28 is switched to the menu of "edit folder" (FIG. 7B). The user selects "delete folder" from the menu items of "edit folder." Thus, the camera mode is set at "folder deletion mode."

Figure 11A:
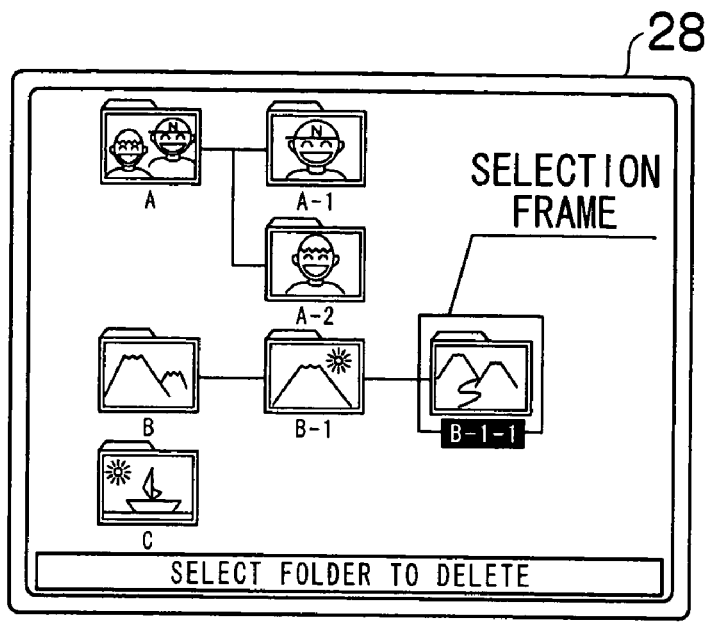
FIGS. 11A to 11B are explanatory views showing "folder deletion mode"

When the camera mode is set at "folder deletion mode," as shown in FIG. 11A, a list of folders created in the recording area of the recording medium 32 is displayed with folder icons on the image display device 28. From the list of folders displayed on the image display device 28, the user selects a folder to be deleted. For example, when the folder "A" is deleted, the folder "A" is selected. When the folder "A-1" is deleted, the folder "A-1" is selected. A selection is made by moving the selection frame with the cross key and a confirmation is made by pressing the menu/OK key. In this case, the folder "B-1-1" is deleted.

Figure 11B:
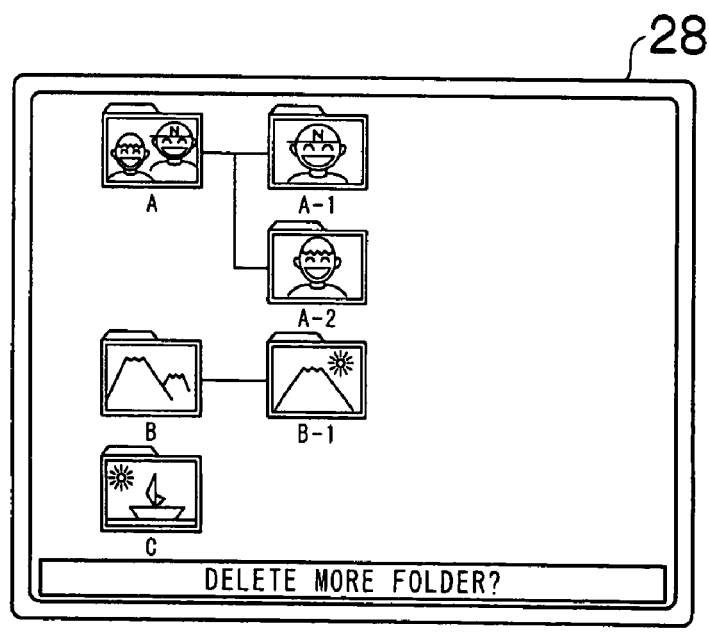

When the folder to be deleted is selected and the menu/OK key is pressed, the CPU 12 detects the press and deletes the selected folder "B-1-1." That is, the selected folder is deleted from the folders created in the recording area of the recording medium 32 and information about the folder is deleted from the folder management information recorded in the EEPROM 17. Then, as shown in FIG. 11B, a list of folders created in the recording area of the recording medium 32 is displayed on the image display device 28 based on the updated folder management information.

In the series of operations, a folder is deleted. Thereafter, when another folder is subsequently deleted, the menu/OK key is pressed while the folder list of FIG. 11B is displayed. When the processing is completed, the cancel key is pressed. When the cancel key is pressed, the CPU 12 detects the press, finishes the deletion of folders, and puts the camera into a mode before a transition is made to "folder deletion mode," that is, "picture taking mode" or "reproduction mode."

The following will describe the procedure of "recording folder setting mode" for designating a folder to store photographed image data.

"Recording folder setting mode" is set from the menu. That is, when the menu/OK key is pressed while the camera mode is set at "picture taking mode" or "reproduction mode," the image display device 28 displays the menu (FIG. 7A). The user selects "edit folder" from menu items displayed on the menu. When "edit folder" is selected, the display of the image display device 28 is switched to the menu of "edit folder" (FIG. 7B). The user selects "set recording folder" from the menu items of "edit folder." Thus, the camera mode is set at "recording folder setting mode."

When the camera mode is set at "recording folder setting mode," a list of folders created in the recording area of the recording medium 32 is displayed with folder icons on the image display device 28 (FIG. 7C). From the list of folders displayed on the image display device 28, the user selects a folder for recording a photographed image to be deleted. For example, when a photographed image is recorded in the folder "A", the folder "A" is selected. When a photographed image is recorded in the folder "A-1", the folder "A-1" is selected. A selection is made by moving the selection frame with the cross key and a confirmation is made by pressing the menu/OK key.

When a recording folder is selected and the menu/OK key is pressed, the CPU 12 detects the press. Thereafter, the recording of an image file is controlled so that the image file is recorded in the selected folder.

When the recording medium 32 is formatted, the folder "A" is automatically created immediately below the root folder "ROOT" in the recording area of the recording medium 32 and a photographed image is recorded in the folder "A".

In the initial setting, the folder "A" is set as a recording folder. When a recording folder is not set, an image file is automatically recorded in the folder "A".

The following will describe the procedure of "folder list display mode" for displaying a list of folders created in the recording area of the recording medium 32. "Folder list display mode" is set from the menu. That is, when the menu/OK key is pressed while the camera mode is set at "picture taking mode" or "reproduction mode," the image display device 28 displays the menu (FIG. 7A). The user selects "edit folder" from menu items displayed on the menu. When "edit folder" is selected, the display of the image display device 28 is switched to the menu of "edit folder" (FIG. 7B). Then, the user selects "display folder list" from the menu items of "edit folder." Thus, the camera is set at "folder list display mode."

When the camera is set at "folder list display mode," a list of folders created in the recording area of the recording medium 32 is displayed with folder icons on the image display device 28 (FIG. 7C). The user recognizes the structure of folders through the display of the image display device 28.

When the display is terminated, the menu/OK key is pressed. When the menu/OK key is pressed, the CPU 12 detects the press and puts the camera into a mode before "folder list display mode," that is, "picture taking mode" or "reproduction mode."

Figure 12:
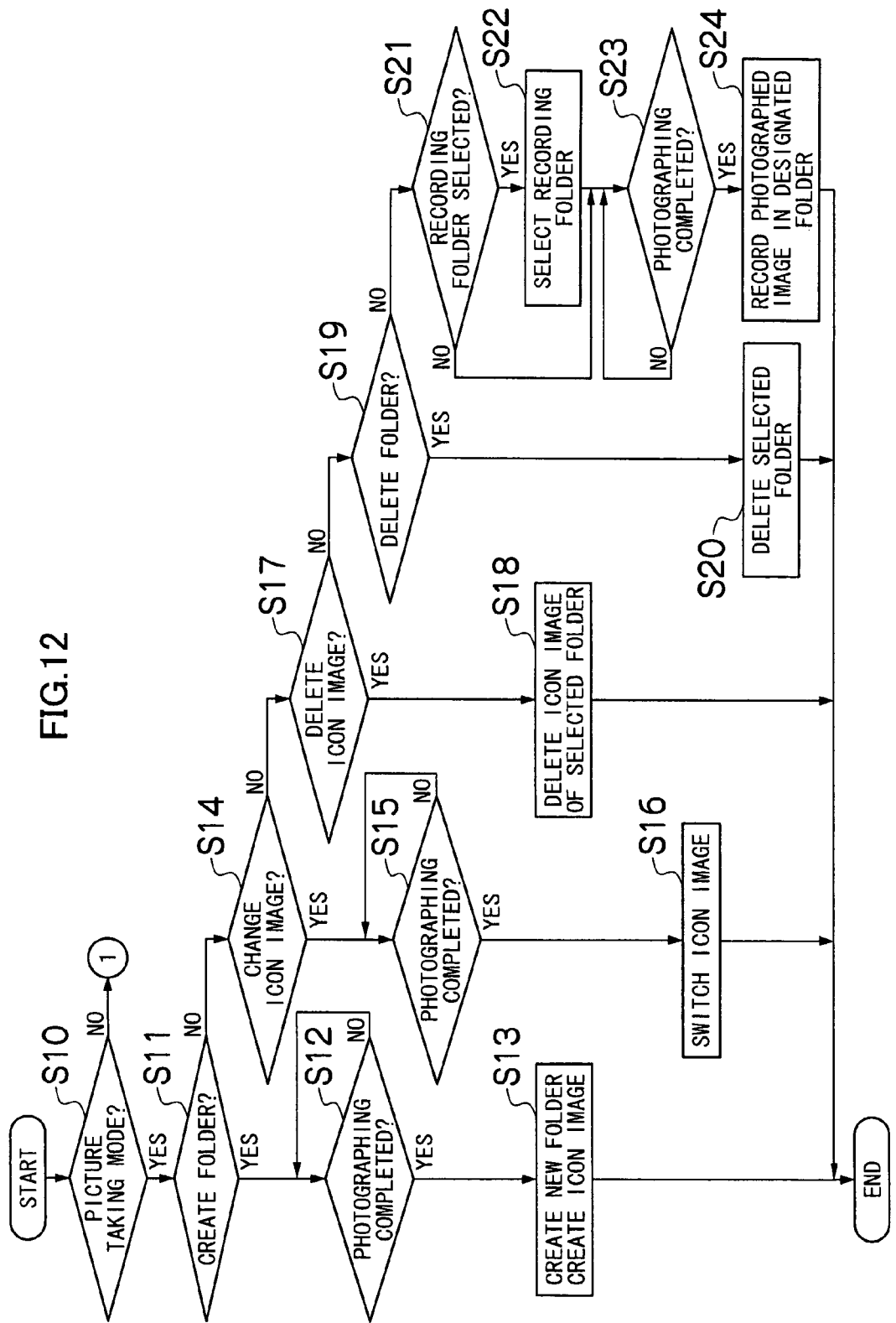
FIG. 12 is a flowchart showing the flow of photographing, reproduction, and folder edits of the digital still camera according to the present embodiment.
Figure 13:
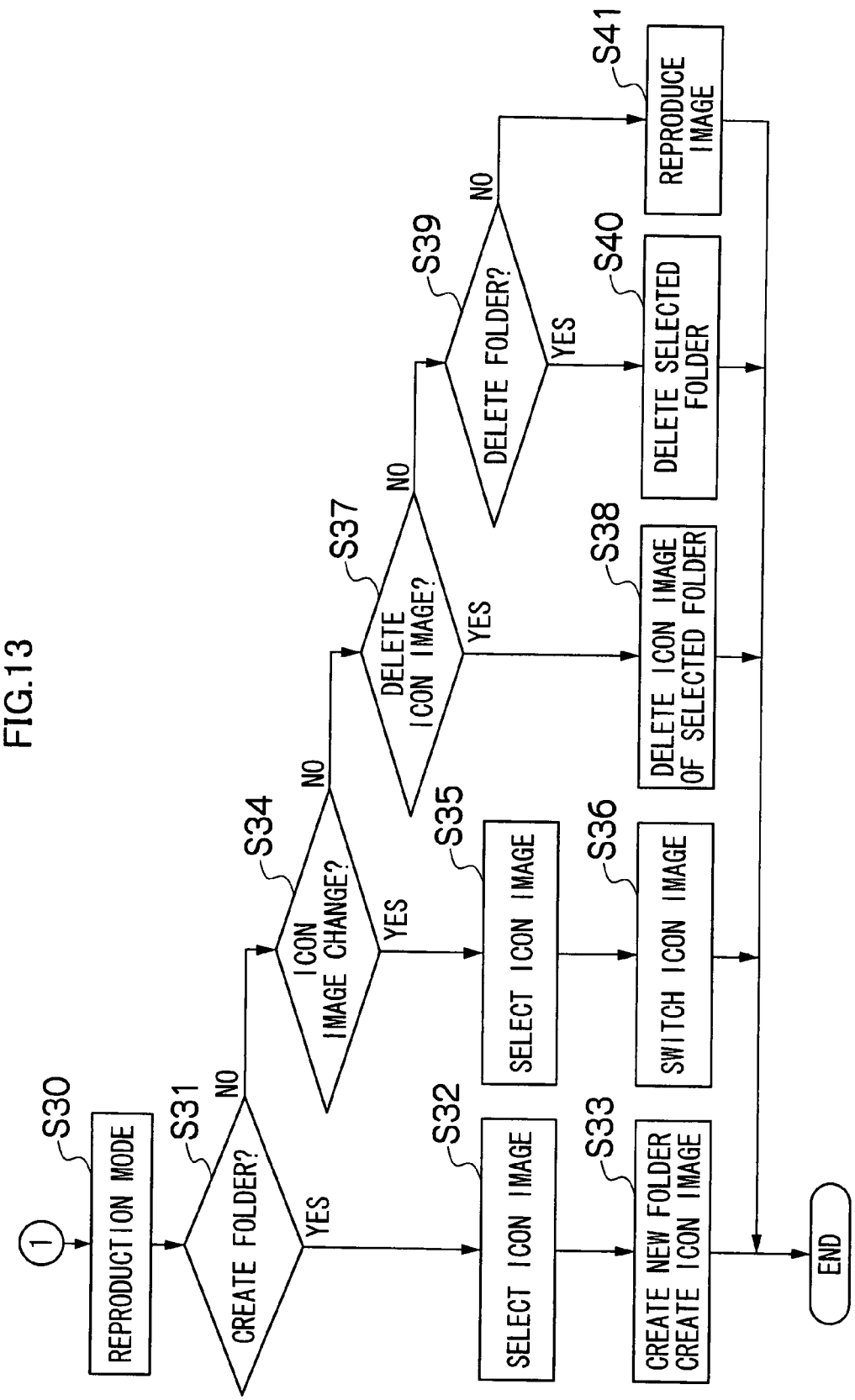
FIG. 13 is a flowchart showing the flow of photographing, reproduction, and folder edits of the digital still camera according to the present embodiment.

Referring to flowcharts shown in FIGS. 12 and 13, the following will describe a series of processing steps including photographing, reproduction, and folder edition of the digital still camera 10 configured thus according to the present embodiment.

As shown in FIG. 12, when the power of the digital still camera 10 is turned on, it is first decided whether the camera mode is set at "picture taking mode" or not (step S10). When the camera mode is set at "picture taking mode," processing advances to step S11. When the camera mode is set at "reproduction mode," processing advances to the flowchart of "reproduction mode" shown in FIG. 13.

First, the following will describe the case where the camera mode is set at "picture taking mode." In this case, it is decided whether the camera mode is set at "folder creation mode" or not (step S11). When it is decided in step S11 that the camera mode is set at "folder creation mode," a folder is created in "picture taking mode." That is, an icon image is photographed (step S12), a folder is newly created under a designated folder in synchronization with the photographing operation, and the icon image of the folder is created based on the photographed image (step S13). Then, information about the folder and the icon image is written in the folder management information recorded in the EEPROM 17.

On the other hand, when it is decided in step S11 that the camera mode is not set at "folder creation mode," it is then decided whether the camera mode is set at "icon image change mode" or not (step S14). When it is decided in step S14 that the camera mode is set at "icon image change mode," the icon image of a designated folder is changed. That is, an icon image is photographed (step S15), a new icon image is created based on the photographed image, and the icon image of the designated folder is switched to the newly created icon image (step S16). That is, the folder management information recorded in the EEPROM 17 is rewritten so that information about the icon image of the designated folder is replaced with information about the newly created icon image.

On the other hand, when it is decided in step S14 that the camera mode is not set at "icon image change mode," it is then decided that the camera mode is set at "icon image deletion mode" or not (step S17). When it is decided in step S17 that the camera mode is set at "icon image deletion mode," the icon image of a selected folder is deleted. That is, a folder having an icon image to be deleted is selected and the folder management information recorded in the EEPROM 17 is rewritten so as to delete the icon information of the selected folder (step S18).

On the other hand, when it is decided in step S17 that the camera mode is not set at "icon image deletion mode," it is then decided that the camera mode is set at "folder deletion mode" or not (step S19). When it is decided in step S19 that the camera mode is set at "folder deletion mode," a designated folder is deleted. That is, a folder to be deleted is selected, the selected folder is deleted from the recording medium 32, and information about the selected folder is deleted from the folder management information recorded in the EEPROM 17 (step S20).

On the other hand, when it is decided in step S19 that the camera mode is not set at "folder deletion mode," it is then decided that the camera mode is set at "recording folder selection mode" or not (step S21).

When it is decided in step S21 that the camera mode is set at "recording folder selection mode," a recording folder is selected. That is, a folder for recording a photographed image is selected (step S22). When a recording folder is selected, a photographing operation is performed (step S23). Thereafter, the photographed image is recorded in the selected recording folder (step S24).

When it is decided in step S21 that the camera mode is not set at "recording folder selection mode," a photographing operation is performed (step S23) and then a photographed image is recorded in a folder selected beforehand or a specified folder (step S24).

The following will describe the case where it is decided in step S10 that the camera mode is not set at "picture taking mode". In this case, processing advances to the flowchart of FIG. 13.

When it is decided in step S10 that the camera mode is not set at "picture taking mode," the camera mode is set at "reproduction mode" (step S30) and thus the subsequent processing is performed in "reproduction mode."

First, it is decided whether the camera mode is set at "folder creation mode" or not (step S31). When it is decided in step S31 that the camera mode is set at "folder creation mode," a folder is created in "reproduction mode." That is, image files recorded in the recording medium 32 are reproduced and an image to be used as an icon image is selected from reproduced images (step S32). Then, in synchronization with the selection, a folder is newly created under a designated folder and the icon image of the folder is created based on the selected image (step S33). Then, information about the folder and the icon image is written in the folder management information recorded in the EEPROM 17.

On the other hand, when it is decided in step S31 that the camera mode is not set at "folder creation mode," it is then decided whether the camera mode is set at "icon image change mode" or not (step S34). When it is decided in step S34 that the camera mode is set at "icon image change mode," the icon image of a designated folder is changed. That is, image files recorded in the recording medium 32 are reproduced and an image to be used as an icon image is selected from the reproduced images (step S35). Then, a new icon image is created based on the selected image and the icon image of the designated folder is switched to the newly created icon image (step S36). That is, the folder management information recorded in the EEPROM 17 is rewritten so that information about the icon image of the designated folder is replaced with information about the newly created icon image.

On the other hand, when it is decided in step S34 that the camera mode is not set at "icon image change mode," it is then decided whether the camera mode is set at "icon image deletion mode" or not (step S37). When it is decided in step S37 that the camera mode is set at "icon image deletion mode," the icon image of a selected folder is deleted. That is, a folder having an icon image to be deleted is selected and the folder management information recorded in the EEPROM 17 is rewritten so as to delete the icon information of the selected folder (step S38).

On the other hand, when it is decided in step S37 that the camera mode is not set at "icon image deletion mode," it is then decided that the camera mode is set at "folder deletion mode" or not (step S39). When it is decided in step S39 that the camera mode is set at "folder deletion mode," a designated folder is deleted. That is, a folder to be deleted is selected, the selected folder is deleted from the recording medium 32, and information about the selected folder is deleted from the folder management information recorded in the EEPROM 17 (step S40).

On the other hand, when it is decided in step S39 that the camera mode is not set at "folder deletion mode," image files recorded in the recording medium 32 are reproduced (step S41).

As described above, according to the digital still camera 10 of the present embodiment, folders can be hierarchically created in the recording area of the recording medium 32 and a photographed image can be recorded in a desired folder. Thus, photographed image data can be sorted and managed according to the preferences of the user.

Further, the structure of folders created in the recording area of the recording medium 32 can be displayed as a list with folder icons on the image display device 28. Images being photographed or photographed images can be displayed on the folder icons of the list. Moreover, an image displayed on the folder icon can be arbitrarily changed. Thus, the contents of folders can be recognized at a glance only by looking at folder icons.

Besides, image files recorded in each folder have different names for each folder so that file names do not overlap. Hence, even after the image files are captured into a personal computer and so on, the image files can be managed with ease. Further, it is possible to prevent a previously captured image file from being overwritten and deleted with another image file due to similar names.

Furthermore, in the digital still camera 10 of the present embodiment, when a folder structure is displayed as a list of hierarchically organized folders, folders on the same level are displayed in the same column and folders on lower levels are expanded and displayed in a lateral direction, so that the folder structure can be recognized at a glance.

In the present embodiment, the folder management information is recorded in the EEPROM 17. The folder management information may be recorded in the recording medium 32. By recording the folder management information in the recording medium, even when the recording medium 32 is unloaded from the digital still camera 10 and then loaded to the digital still camera 10 again, a previously used folder and icon image can be continuously used. Moreover, by using special application software, even in a personal computer having captured data, a list of folders can be displayed on the display by using folder icons displayed with icon images.

Further, in the present embodiment, an instruction to photograph is provided in response to the press of the release button 24. When a self-timer, a remote control, and the like are provided, an instruction to photograph may be provided by means of these functions.

The following will describe Embodiment 2 of a digital still camera according to the present invention.

As described above, the digital still camera 10 of Embodiment 1 can hierarchically create folders in the recording area of the recording medium 32 and cause the image display device 28 to display a list of the hierarchically created folders with folder icons on the image display device 28. Further, the user can display preferred images (icon images) on the folder icons of the list.

In the digital still camera of the present embodiment, when a recording medium is replaced, management information about folders created in a recording medium 32 before replacement is taken over to another recording medium after replacement. That is, folders having the same structures as folders created in the recording medium before replacement are created in the recording medium after replacement, and a list of folders is displayed on an image display device by using icon images similar to those of the folders created before replacement.

Figure 14:
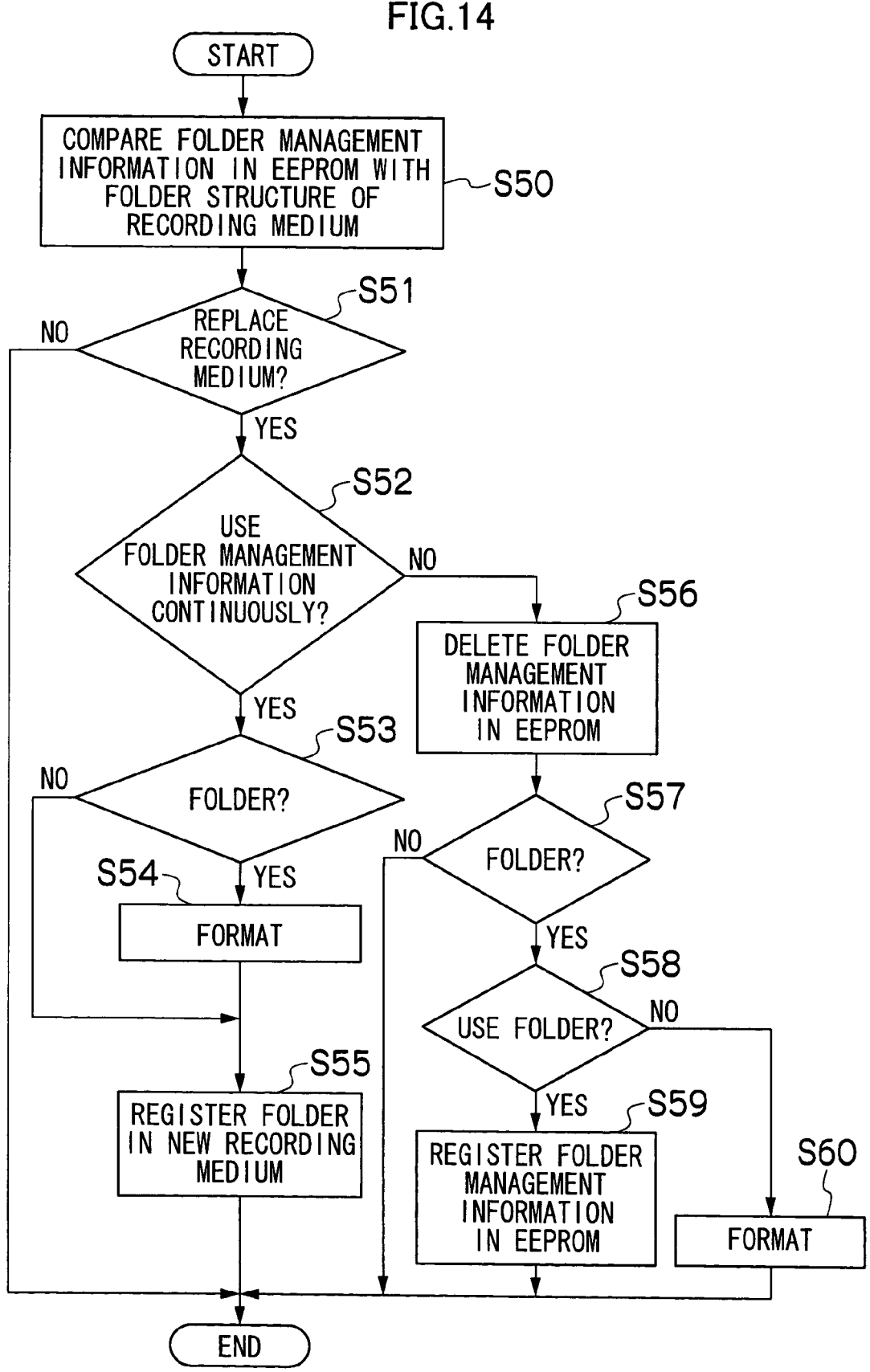
FIG. 14 is a flowchart showing the steps of taking over folder management information upon replacement of the recording medium.

Referring to the flowchart of FIG. 14, the following will describe a method of taking over folder management information when the recording medium is replaced.

When the power of the digital still camera 10 is turned on, a CPU 12 compares a folder structure created in the recording medium 32 with folder management information recorded in an EEPROM 17 (step S50) to decide whether the recording medium 32 is replaced or not (step S51).

Also when the recording medium 32 is removed from a medium socket 30 and another recording medium 32 is inserted into the medium socket 30, a folder structure created in the another recording medium 32 is compared with folder management information recorded in the EEPROM 17 (step S50) to decide whether the recording medium 32 is different from the medium having been loaded before replacement (step S51).

When the recording medium 32 is not replaced, the recording medium 32 is continuously used as it is.

On the other hand, when the recording medium 32 is replaced, it is decided whether the folder management information of the previous recording medium 32 should be continuously used or not for the replaced new medium 32 (step S52). Namely, when it is decided that the recording medium 32 is replaced, the CPU 12 outputs a message to an image display device 28 to inquire about whether the folder management information of a folder created in the previous recording medium should be continuously used or not. When the folder management information of a folder created in the previous recording medium is continuously used, the user presses a menu/OK key, otherwise the user presses a cancel key.

When the CPU 12 detects the press of the menu/OK key, that is, when it is decided that the folder management information of the previous recording medium 32 should be continuously used for the replaced new medium 32, it is decided whether a folder has been created in the new recording medium 32 (step S53). When a folder has been created, the new recording medium 32 is formatted (step S54) and then a folder having the same structure as a folder having been created in the previous recording medium is created in the new medium 32 based on the folder management information of the previous recording medium that has been recorded in the EEPROM 17 (step S55). Hence, the folder management information of the recording medium before replacement can be continuously used as it is. When an unnecessary folder is omitted or an icon image is changed, a folder structure can be corrected into a desired one by performing the above-described edits on folders.

On the other hand, when the CPU 12 detects the press of the cancel key, that is, when it is decided that the folder management information of the previous recording medium 32 should not be continuously used for the replaced new medium 32, the CPU 12 deletes the folder management information of the previous recording medium that has been recorded in the EEPROM 17 (step S56).

Thereafter, it is decided whether a folder has been created in the new recording medium 32 (step S57). When a folder has been created, it is decided whether the folder should be used as it is (step S58). That is, when a folder has been created in the new recording medium 32, the CPU 12 outputs a message to the image display device 28 to inquire about whether the folder in the new recording medium should be used as it is. When the folder in the new recording medium is used as it is, the user presses the menu/OK key, otherwise the user presses the cancel key.

When the CPU 12 detects the press of the menu/OK key, that is, when it is decided that the folder in the new recording medium should be used as it is, another folder management information is created based on information about the folder in the new recording medium 32 and is recorded in the EEPROM 17 (step S59). Thereafter, image files are recorded by using the folder in the new recording medium 32.

On the other hand, when the CPU 12 detects the press of the cancel key, that is, when it is decided that the folder in the new recording medium should not be used as it is, the CPU 12 formats the new recording medium 32 (step S60).

When the CPU 12 formats the recording medium 32, a folder "A" is created in the same level as a root folder "ROOT". When a folder is not created, a photographed image file is recorded in the folder "A".

In this way, according to the digital still camera of the present embodiment, even when a recording medium is replaced with another, folder management information in the recording medium before replacement can be continuously used for another recording medium after replacement. Thus, it is possible to save the time and effort of setting a folder every time a recording medium is replaced with another, thereby improving operability.

The following will describe Embodiment 3 of a digital still camera according to the present invention.

In the digital still camera according to Embodiment 1, when the structure of folders created in the recording area of the recording medium is displayed as a list on the image display device 28, the folder icons of the folders are similar in size.

Figure 15:
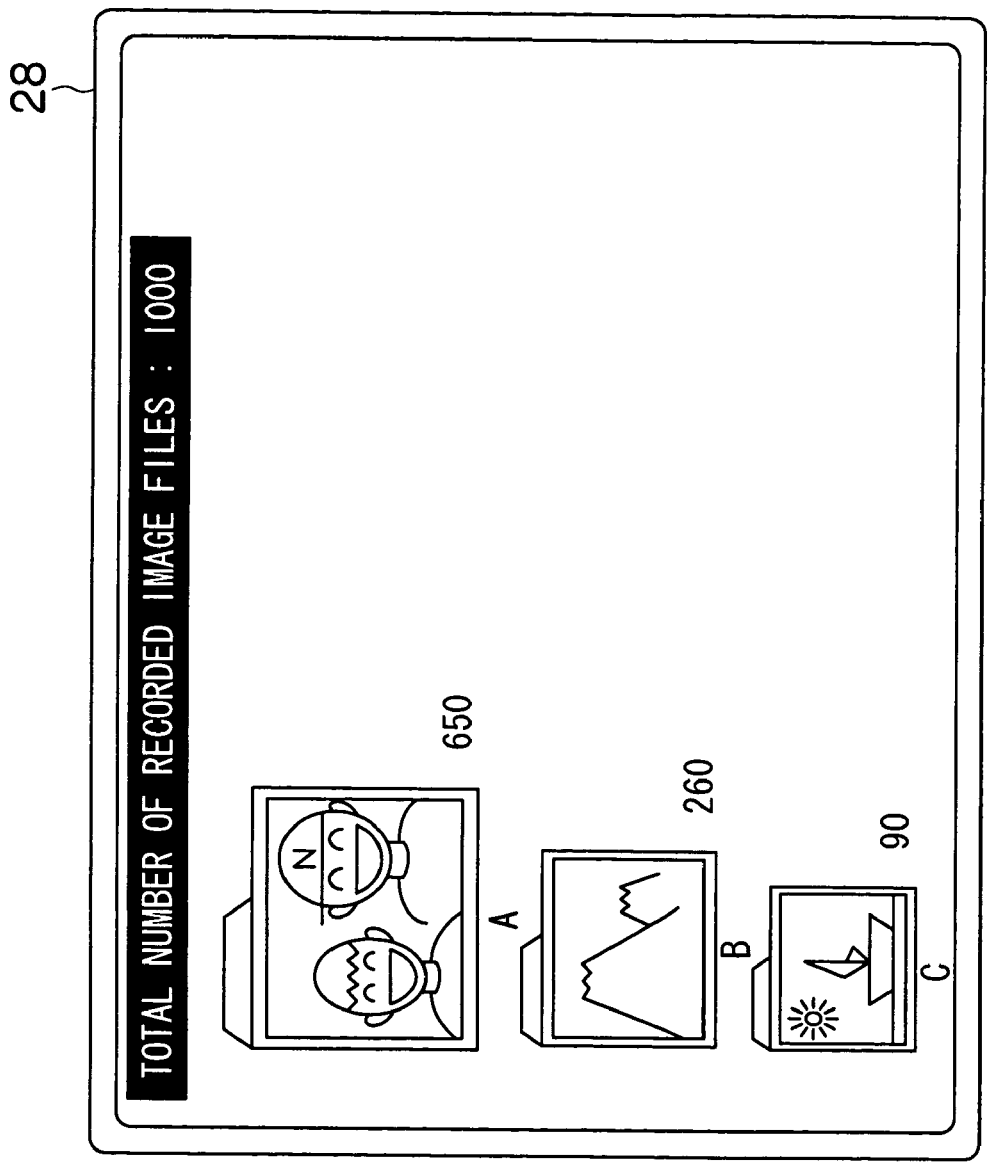
FIG. 15 is a diagram showing a display example of folders in a digital still camera of Embodiment 3.

In the digital camera of the present embodiment, as shown in FIG. 15, when a list of folders is displayed with folder icons on an image display device 28, the folder icons are varied in size according to the number of image files stored in each folder. The method of displaying folders will be discussed below.

When a folder list is displayed on the image display device 28, a CPU 12 first accesses to a recording medium 32 to obtain the number of image files recorded in each folder of the recording medium 32. Then, the CPU 12 calculates a total number of image files recorded in the recording medium 32 and calculates a ratio of the number of image files recorded in each folder to the calculated total number of recorded image files.

For example, as shown in FIG. 15, when it is assumed that three folders "A", "B", and "C" are created in the recording area of the recording medium 32, the folder "A" has 650 image files, the folder "B" has 260 image files, and the folder "C" has 90 image files, the total number of image files recorded in the recording medium 32 is 1000. The ratios of image files recorded in the folders are: 650/1000 for the folder "A", 260/1000 for the folder "B", and 90/1000 for the folder "C".

Figure 16:
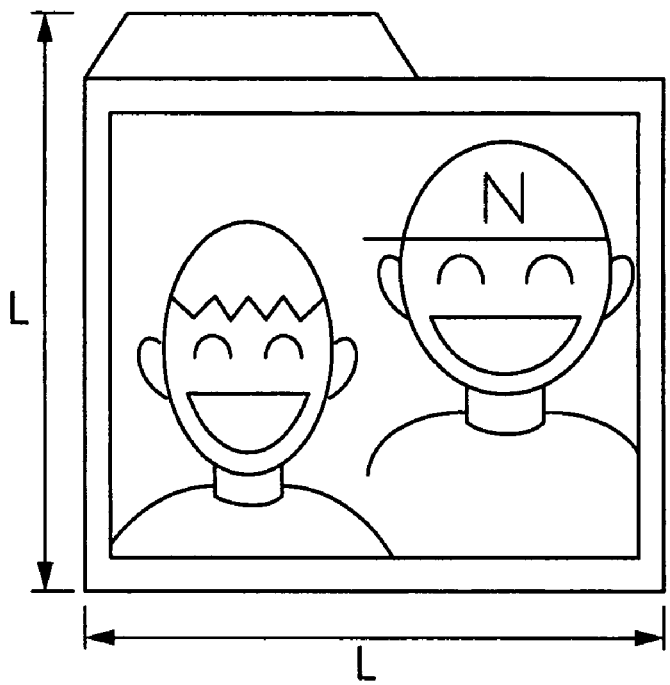
FIG. 16 is an explanatory view showing a method of displaying a folder icon.

Then, the CPU 12 sets the size of the folder icon displayed on the image display device 28 based on the calculated ratio of recorded image files. As shown in FIG. 16, this setting is made according to a predetermined size switching table. That is, according to the ratio of recorded image files, a length L is set which represents each side of the folder icon displayed on the image display device 28. The calculated ratio of recorded image files is checked against the size switching table to set the size of the folder icon displayed on the image display device 28.

For example, in the case of the size switching table of this example, when the ratio of image files recorded in a folder to the total number of image files recorded in the recording medium 32 is less than 1/4, the size of the folder icon is 5×5 mm, when the ratio is 1/4 to 2/4, the size is 7×7 mm, when the ratio is 2/4 to 3/4, the size is 10×10 mm, and when the ratio is 3/4 or larger, the size is 15×15 mm.

When the folders "A" to "B", in which the image files are recorded in the same manner as this example, are recorded in the image display device 28, the ratio of image files recorded in the folder "A" to the total number is 650/1000 and thus the size of the folder icon is set at 10×10 mm. The ratio of image files recorded in the folder "B" to the total number is 260/1000 and thus the size of the folder icon is set at 7×7 mm. The ratio of image files recorded in the folder "C" to the total number is 90/1000 and thus the size of the folder icon is set at 5×5 mm.

In this way, the CPU 12 sets the size of the folder icon of each folder according to a ratio of image files recorded in each folder. Then, the CPU 12 displays a list of folders on the image display device 28 so as to display the folder icons with the set sizes.

At this point, as shown in FIG. 15, the total number of image files recorded in the recording medium 32 is displayed on the upper left corner of the image display device 28 and the number of image files actually recorded in each folder is displayed on the right of each folder.

In this way, according to the digital still camera of the present embodiment, when a list of folders created in the recording medium 32 is displayed on the image display device 28, each folder icon is enlarged or reduced according to the number of image files recorded in each folder. Thus, the number of image files currently recorded in each folder can be recognized at a glance by looking at a list of folder icons.

Further, as described in the present embodiment, the total number of recorded image files and the number of image files recorded in each folder are displayed along with folder icons, so that the usage pattern of each folder can be recognized more clearly.

In the present embodiment, the folder icon is varied in size according to the number of image files recorded in each folder. The folder icon may be varied in size according to a capacity of an image file recorded in each folder.

Further, in the present embodiment, an icon image is displayed on each folder icon. The icon image may not be displayed.

Moreover, the series of embodiments described examples in which the present invention is applied to a digital still camera capable of recording and reproducing static images. The present invention is similarly applicable to a digital still camera capable of recording and reproducing moving images as well as static images.

Moreover, the series of embodiments described examples in which the present invention is applied to a digital still camera. The application of the present invention is not limited to a digital still camera but is applicable to, for example, every kind of devices for recording files in a recording medium, in addition to electronic devices (imaging devices) capable of photographing. Such electronic devices include a digital video camera, a mobile phone with a built-in camera, a PDA with a built-in camera, and a personal computer with a built-in camera that are capable of recording and reproducing moving images. That is, the present invention is applicable to every kind of devices as long as the device records files in a recording medium, and the kinds of files recorded in the recording medium are not limited at all. Therefore, it is also possible to store a text file, a document file, and a music file, and so on in a folder created according to the present invention. In this case, the shortcut of the file (shortcut file) may be stored instead of the entity of the file.

Further, when the present invention is applied to a device other than electronic devices having a photographing function, the device for acquiring image data used as an icon image (image input device) is not limited to a digital camera and thus a scanner is also applicable. Moreover, the image data may be acquired from an image database in which the image data is recorded.

Besides, the image data used as an icon image may be obtained by cutting a frame of moving image data.

What is claimed is:

1. A programmable storage medium tangibly embodying a program of machine-readable instructions executable by a digital processing apparatus on a digital camera to perform operations on the digital camera supporting, creating a folder in a recording area of a recording medium, storing a file in the folder, and managing the file, the operations comprising:
    creating a folder in the recording area of the recording medium in synchronization with a photographing operation of said digital camera;
    inputting image data used as an icon image of the created folder;
    creating an icon image of the folder based on the inputted image data;
    storing, in a storage device, information about the folder created in the recording area of the recording medium and the icon image of the folder;
    providing an instruction to display a list of folders created in the recording area of the recording medium; and
    displaying, on a display device, a list of folders created in the recording area of the recording medium based on the information stored in the storage device in response to the instruction to display a list of folders, the list displayed with folder icons including the icon images.

2. The programmable storage medium tangibly embodying a program of machine-readable instructions executable by a digital processing apparatus according to claim 1, the operations further comprising:
    selecting a folder that stores a file, from a list of folders displayed with folder icons on the display device.

3. The programmable storage medium tangibly embodying a program of machine-readable instructions executable by a digital processing apparatus according to claim 1, the operations further comprising:
    providing an instruction to successively create folders; and
    creating a folder under the previously created folder in response to the instruction to successively create folders.

4. The programmable storage medium tangibly embodying a program of machine-readable instructions executable by a digital processing apparatus according to claim 1, the operations further comprising:
    selecting a folder including an icon image to be changed, from a list of folders displayed with folder icons on the display device;
    inputting image data used as a new icon image of the selected folder;
    creating a new icon image of the folder based on the inputted image data; and
    rewriting the information stored in the storage device.

5. A file management method in a digital camera that creates a folder in a recording area of a recording medium, stores a file in the folder, and manages the file, the method comprising:
    creating a folder in the recording area of the recording medium in synchronization with a photographing operation of said digital camera;
    inputting image data used as an icon image of the created folder;
    creating an icon image of the folder based on the inputted image data;
    storing, in a storage device, information about the folder created in the recording area of the recording medium and the icon image of the folder; and
    displaying, on a display device, a list of folders created in the recording area of the recording medium based on the information stored in the storage device in response to an instruction to display a list of folders, the list displayed with folder icons including the icon images.

6. The file management method according to claim 5, further comprising:
    selecting a folder that stores a file, from a list of folders displayed with the folder icons on the display device.

7. The file management method according to claim 5, further comprising;
    creating a folder under the previously created folder in response to an instruction to successively create folders.

8. The file management method according to claim 5, further comprising:
    selecting a folder including an icon image to be changed, from a list of folders displayed with the folder icons on the display device;
    inputting image data used as a new icon image of the selected folder;
    creating a new icon image of the folder based on the inputted image data; and
    rewriting the information stored in the storage device.

9. A file management apparatus in a digital camera that creates a folder in a recording area of a recording medium, storing a file in the folder, and managing the file, the apparatus. comprising:
    a folder creating device that creates a folder in the recording area of the recording medium in synchronization with a photographing operation of said digital camera;
    an image input device that inputs image data used as an icon image of the folder created by the folder creating device;
    an icon image creating device that creates an icon image of the folder based on the image data inputted from the image input device;
    a folder information storage device that stores information about the folder created in the recording area of the recording medium and the icon image of the folder;
    a folder display instructing device that provides an instruction to display a list of folders created in the recording area of the recording medium; and
    a display control device that displays, on a display device, a list of folders created in the recording area of the recording medium based on the information stored in the folder information storage device in response to the instruction to display the list of folders from the folder display instructing device, the list displayed with folder icons including the icon images.

10. The file management apparatus according to claim 9, further comprising a recording folder selecting device that selects a folder that stores a file, from a list of folders displayed with the folder icons on the display device.

11. The file management apparatus according to claim 9, further comprising a folder successive creation instructing device that provides an instruction to successively create folders,
    wherein the folder creating device creates a folder under the previously created folder in response to an instruction of the folder successive creation instructing device to successively create folders.

12. The file management apparatus according to claim 9, further comprising:

a folder selecting device that selects a folder including an icon image to be changed, from a list of folders displayed with folder icons on the display device;

a new icon image creating device that creates a new icon image of the folder, which has been selected by the folder selecting device, based on the image data inputted from the image input device; and a folder information updating device that replaces information about the icon image of the folder selected by the folder selecting device with information about the new icon image created by the new icon image creating device.

13. A digital camera imaging device, in which image data can be recorded as an image file of a predetermined format in a recording medium, the image data acquired from an image pickup device in response to an instruction to photograph, and the image file recorded in the recording medium reproduced and displayed on a display device, said imaging device comprising:

a folder creation mode setting device that sets a mode of the imaging device at folder creation mode;

a folder creating device that creates a new folder in a recording area of the recording medium in synchronization with an instruction to photograph in the folder creation mode;

an icon image creating device that creates an icon image of the newly created folder in the folder creation mode, the icon image creating device acquiring the image data from the image pickup device in response to the instruction to photograph and creating the icon image based on the image data;

a folder information storage device that stores information about the folder created in the recording area of the recording medium and the icon image of the folder;

a display control device that displays, on the display device, a list of folders created in the recording area of the recording medium based on the information stored in the folder information storage device, the list displayed with folder icons including the icon images;

a recording folder selecting device that selects a desired folder icon from the folder icons displayed on the display device to select a folder that records the image data having been acquired from the image pickup device; and a recording control device that records the image data, which has been acquired from the image pickup device, in the folder selected by the recording folder selecting device.

14. The digital camera imaging device according to claim 13, wherein after the folder creating device creates a new folder in the recording area of the recording medium under the folder creation mode in response to an instruction to photograph, when another instruction to photograph is provided, the folder creating device creates a new folder under the newly created folder.

15. The digital camera imaging device according to claim 13, further comprising:

an icon image change mode setting device that sets the mode of the imaging device at icon image change mode;

a folder selecting device that selects a folder including an icon image to be changed, by selecting a desired folder icon from a list of folders displayed with the folder icons on the display device by the display control device in the icon image change mode;

a new icon image creating device that creates a new icon image of the folder selected by the folder selecting device, the new icon image creating device acquiring image data from the image pickup device in response to the instruction to photograph and creating the new icon image based on the image data in the icon image change mode; and a folder information updating device that replaces information about the icon image of the folder selected by the folder selecting device with information about the new icon image and causing the folder information storage device to store the information.

16. An digital camera imaging device, in which image data can be recorded as an image file of a predetermined format in a recording medium, the image data having been acquired from an image pickup device in response to the instruction to photograph, and the image file recorded in the recording medium can be reproduced and displayed on a display device, comprising:

a folder creation mode setting device that sets a mode of the imaging device at folder creation mode;

an image selecting device that selects an image to be used as an icon image from images reproduced and displayed on the display device in the folder creation mode;

a folder creating device that creates a new folder in a recording area of the recording medium in response to image selection of the image selecting device in the folder creation mode;

an icon image creating device that creates an icon image of the newly created folder in response to the image selection of the image selecting device in the folder creation mode, the icon image creating device creating the icon image based on the image data of the image selected by the image selecting device;

a folder information storage device that stores information about the folder created in the recording area of the recording medium and the icon image of the folder;

a display control device that displays, on the display device, a list of folders created in the recording area of the recording medium based on the information stored in the folder information storage device, the list displayed with folder icons including the icon images;

a recording folder selecting device that selects a desired folder icon from the folder icons displayed on the display device to select a folder that records the image data having been acquired from the image pickup device; and a recording control device that records the image data, which has been acquired from the image pickup device, in the folder selected by the recording folder selecting device.

17. The digital camera imaging device according to claim 16, wherein when the folder creating device creates a new folder in the recording area of the recording medium in response to the image selection of the image selecting device and then another image is selected by the image selecting device, the folder creating device creates another new folder under the newly created folder.

18. The digital camera imaging device according to claim 16, further comprising:

an icon image change mode setting device that sets the mode of the imaging device at icon image change mode;

a folder selecting device that selects a folder including an icon image to be changed, by selecting a desired folder icon from a list of folder icons displayed on the display device by the display control device in the icon image change mode;

a new icon image creating device that creates a new icon image of the folder selected by the folder selecting device, the new icon image creating device creating the new icon image based on the image selected by the image selecting device from the images reproduced and displayed on the display device in the icon image change mode; and a folder information updating device that replaces information about the icon image of the folder selected by the folder selecting device with information about the new icon image and causing the folder information storage device to store the information.

* * * * *